(12) United States Patent
Minagawa et al.

(10) Patent No.: US 12,072,234 B2
(45) Date of Patent: Aug. 27, 2024

(54) ELECTROMAGNETIC WAVE DETECTION APPARATUS AND INFORMATION ACQUISITION SYSTEM

(71) Applicant: KYOCERA Corporation, Kyoto (JP)

(72) Inventors: Hiroyuki Minagawa, Yokohama (JP); Eri Takeuchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 784 days.

(21) Appl. No.: 17/047,118

(22) PCT Filed: Apr. 17, 2019

(86) PCT No.: PCT/JP2019/016477
§ 371 (c)(1),
(2) Date: Oct. 13, 2020

(87) PCT Pub. No.: WO2019/216140
PCT Pub. Date: Nov. 14, 2019

(65) Prior Publication Data
US 2021/0148752 A1    May 20, 2021

(30) Foreign Application Priority Data

May 8, 2018    (JP) .................................. 2018-090178

(51) Int. Cl.
*G01C 3/08* (2006.01)
*G01J 1/04* (2006.01)
(Continued)

(52) U.S. Cl.
CPC ............... *G01J 1/0414* (2013.01); *G01J 1/44* (2013.01); *G01S 7/4814* (2013.01); *G01S 17/08* (2013.01); *G02B 26/08* (2013.01); *G02B 26/10* (2013.01)

(58) Field of Classification Search
None
See application file for complete search history.

(56) References Cited

U.S. PATENT DOCUMENTS 5,986,815 A    11/1999  Bryars
8,860,835 B2   10/2014  Kelly et al.
(Continued)

FOREIGN PATENT DOCUMENTS

CN        1482488 A     3/2004
CN      201449491 U     5/2010
(Continued)

*Primary Examiner* — Mark Hellner
(74) *Attorney, Agent, or Firm* — Studebaker & Brackett PC

(57) ABSTRACT

An electromagnetic wave detection apparatus causes electromagnetic waves incident on a reference surface to propagate in a particular direction using each of the pixels, a detector to detect electromagnetic waves incident on a detection surface, and a second propagation unit that includes a first surface opposing the reference surface, a second surface opposing the detection surface, and a third surface intersecting the first and second surface. The third surface causes electromagnetic waves propagating in a first direction to propagate in a second direction. The first surface causes electromagnetic waves propagating in a second direction to be incident on the reference surface and causes electromagnetic waves re-incident from the reference surface to propagate in a third direction. The third surface causes electromagnetic waves propagating in the third direction to propagate in a fourth direction. The second surface emits electromagnetic waves propagating in the fourth direction to the detection surface.

16 Claims, 15 Drawing Sheets

(51) Int. Cl.
*G01J 1/44* (2006.01)
*G01S 7/481* (2006.01)
*G01S 17/08* (2006.01)
*G02B 26/08* (2006.01)
*G02B 26/10* (2006.01)

(56) References Cited

U.S. PATENT DOCUMENTS

| | | | |
|---|---|---|---|
| 10,018,724 B2 * | 7/2018 | Royo Royo | G01S 17/32 |
| 10,698,108 B2 * | 6/2020 | Magee | G01S 17/10 |
| 10,838,044 B2 * | 11/2020 | Okada | G02B 26/0833 |
| 2003/0132405 A1 | 7/2003 | Some | |
| 2007/0263226 A1 | 11/2007 | Kurtz et al. | |
| 2010/0099984 A1 | 4/2010 | Graser | |
| 2012/0038786 A1 | 2/2012 | Kelly et al. | |
| 2012/0038817 A1 | 2/2012 | McMackin et al. | |
| 2013/0077142 A1 | 3/2013 | Schneider et al. | |
| 2015/0029503 A1 | 1/2015 | McMackin | |
| 2015/0378023 A1 | 12/2015 | Royo Royo et al. | |
| 2017/0299697 A1 | 10/2017 | Swanson | |
| 2018/0252513 A1 * | 9/2018 | Takashima | G01S 7/4815 |

FOREIGN PATENT DOCUMENTS

| | | | |
|---|---|---|---|
| CN | 201820036 U | 5/2011 | |
| CN | 102830483 A | 12/2012 | |
| CN | 104359810 A | 2/2015 | |
| CN | 105891921 A | 8/2016 | |
| CN | 107607040 A | 1/2018 | |
| EP | 2603828 A1 | 6/2013 | |
| EP | 2957926 A1 | 12/2015 | |
| EP | 3428677 A1 | 1/2019 | |
| JP | 3507865 B2 | 3/2004 | |
| JP | 2013150146 A | 8/2013 | |
| JP | 2013-535931 A | 9/2013 | |
| WO | 2017/004066 A1 | 1/2017 | |
| WO | 2017/040066 A1 | 3/2017 | |
| WO | WO 2018019666 A1 * | 2/2018 | G01N 21/45 |

* cited by examiner ized is known (e.g., see PTL 1).
ELECTROMAGNETIC WAVE DETECTION APPARATUS AND INFORMATION ACQUISITION SYSTEM

CROSS REFERENCE TO RELATED APPLICATION

This application claims priority to and the benefit of Japanese Patent Application No. 2018-90178 (filed on May 8, 2018), the entire contents of which are incorporated herein by reference.

TECHNICAL FIELD

The present disclosure relates to an electromagnetic wave detection apparatus and an information acquisition system.

BACKGROUND

Conventionally, a configuration in which an image sensor further forms an image of an image formed and reflected by a mirror device is known (e.g., see PTL 1).

CITATION LIST

Patent Literature

PTL 1: Japanese Patent No. 3507865

SUMMARY

An electromagnetic wave detection apparatus according to an embodiment of the present disclosure includes a first propagation unit, a detector, and a second propagation unit. The first propagation unit includes a reference surface and a plurality of pixels arranged along the reference surface and causes electromagnetic waves incident on the reference surface to propagate in a particular direction using each of the pixels. The detector includes a detection surface and detects electromagnetic waves incident on the detection surface. The second propagation unit includes a first surface opposing the reference surface, a second surface opposing the detection surface, and a third surface intersecting the first surface and the second surface. The third surface causes electromagnetic waves propagating in a first direction intersecting the third surface to propagate in a second direction intersecting the first surface. The first surface causes electromagnetic waves propagating in the second direction to be incident on the reference surface. The first surface causes electromagnetic waves re-incident from the reference surface to propagate in a third direction intersecting the third surface. The third surface causes electromagnetic waves propagating in the third direction to propagate in a fourth direction intersecting the second surface. The second surface emits electromagnetic waves propagating in the fourth direction to the detection surface.

An information acquisition system according to an embodiment of the present disclosure includes an electromagnetic wave detection apparatus and a control apparatus. The electromagnetic wave detection apparatus includes a first propagation unit, a detector, and a second propagation unit. The first propagation unit includes a reference surface and a plurality of pixels arranged along the reference surface and causes electromagnetic waves incident on the reference surface to propagate in a particular direction using each of the pixels. The detector includes a detection surface and detects electromagnetic waves incident on the detection surface. The second propagation unit includes a first surface opposing the reference surface, a second surface opposing the detection surface, and a third surface intersecting the first surface and the second surface. The third surface causes electromagnetic waves propagating in a first direction intersecting the third surface to propagate in a second direction intersecting the first surface. The first surface causes electromagnetic waves propagating in the second direction to be incident on the reference surface. The first surface causes electromagnetic waves re-incident from the reference surface to propagate in a third direction intersecting the third surface. The third surface causes electromagnetic waves propagating in the third direction to propagate in a fourth direction intersecting the second surface. The second surface emits electromagnetic waves propagating in the fourth direction to the detection surface. The control apparatus acquires information regarding the surroundings, based on a detection result of electromagnetic waves by the detector.

DETAILED DESCRIPTION

Hereinafter, embodiments according to the present disclosure will be described in detail with reference to the drawings. The drawings used in the following description are schematic. The dimensions and ratios in the drawings are not necessarily drawn to scale.

FIRST EMBODIMENT

Figure 1:
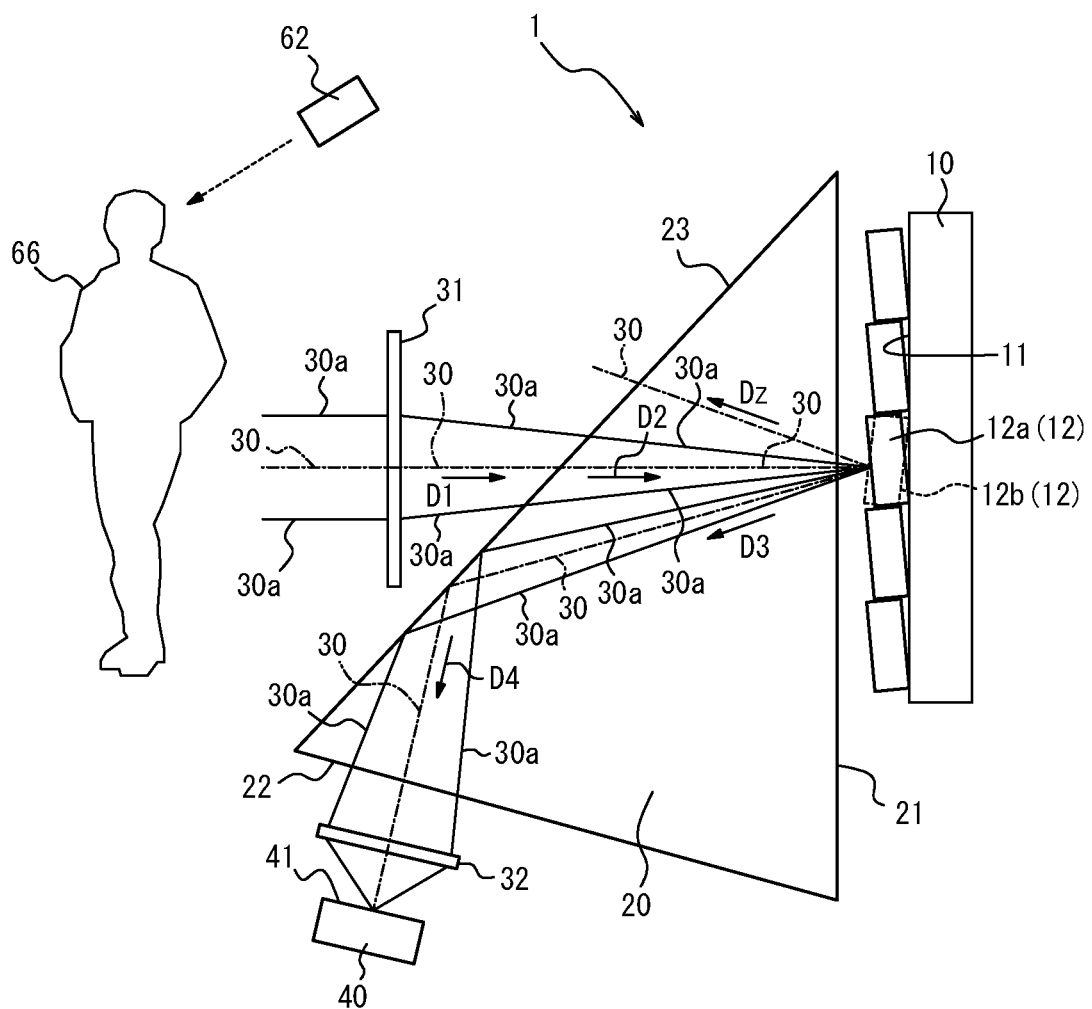
FIG. 1 is a diagram illustrating an example configuration of an electromagnetic wave detection apparatus according to a first embodiment.

A secondary imaging optical system using a digital micromirror device (DMD: Digital Mirror Device) or the like may include a first lens to form an image of incident light on the DMD and a second lens to form an image of reflected light from the DMD on a sensor. Because of characteristics of the DMD, an angle formed by incident light and reflected light may be relatively small. When the angle formed by incident light and reflected light is small, reflected light tends to be blocked by the first lens. When reflected light is blocked, vignetting of reflected light may occur. Vignetting of reflected light may reduce a level of light in an image obtained by forming an image of reflected light and also cause variations in the level of light at each angle of view. Further, when the angle formed by incident light and reflected light is small, sizes or positions of the first and second lenses may be restricted. To avoid such problems, a back focus of the first lens can be lengthened, although it may cause enlargement of an optical system, deteriorate an imaging performance of a lens, and limit angle widening. The electromagnetic wave detection apparatus 1 according to an embodiment of the present disclosure as illustrated in FIG. 1 controls a propagation direction of reflected light from the DMD and thus can secure a level of light incident on the sensor without lengthening the back focus of the first lens and suppress variations in the level of light at each angle of view. Because the back focus of the first lens is not lengthened, the optical system can be downsized and widened, whereby an imaging performance of the optical system can be improved.

As illustrated in FIG. 1, the electromagnetic wave detection apparatus 1 according to the first embodiment includes a first propagation unit 10, a second propagation unit 20, and a first detector 40. The electromagnetic wave detection apparatus 1 detects electromagnetic waves incident from a detection object 66. The electromagnetic wave detection apparatus 1 controls a propagation direction of electromagnetic waves using the first propagation unit 10 and the second propagation unit 20. The electromagnetic wave detection apparatus 1 causes electromagnetic waves to propagate along, for example, a propagation axis 30 illustrated in FIG. 1. The propagation axis 30 corresponds to a principal ray at each angle of view when the electromagnetic waves are light. The electromagnetic waves propagating along the propagation axis 30 have a predetermined spread range represented by a light flux 30a. The electromagnetic wave detection apparatus 1 causes electromagnetic waves to be incident on the first detector 40, and the first detector 40 detects the electromagnetic waves. The first detector 40 is also simply referred to as a detector.

The first propagation unit 10 includes a reference surface 11 and a plurality of pixels 12 positioned along the reference surface 11. It can be said that the plurality of pixels 12 are arranged along the reference surface 11. The pixels 12 can change a propagation direction of electromagnetic waves incident on the reference surface 11. Each of the pixels 12 can cause the electromagnetic waves incident on the reference surface 11 to transition to one of a first state to propagate in a predetermined direction and a second state to propagate in a direction different from the predetermined direction. The first propagation unit 10 may cause each of the pixels 12 to transition to one of the first state and the second state. The first propagation unit 10 may further include a processor configured to control the transition of each of the pixels 12. Each of the pixels 12 transitions to one of the first state or the second state and thus causes the electromagnetic waves incident on the reference surface 11 to propagate in a particular direction. The pixel 12 transitioned to the first state is represented by a pixel 12a indicated by a solid line. The pixel 12 transitioned to the second state is represented by a pixel 12b indicated by a broken line.

The pixel 12 may include a reflection surface that reflects electromagnetic waves incident on the reference surface 11. The first propagation unit 10 may determine a reflection direction of the electromagnetic waves incident on the reference surface 11 by controlling an orientation of the reflecting surface of each of the pixels 12. The orientation of the reflection surface of each of the pixels 12 may be associated with each of the first state and the second state. That is, the first propagation unit 10 may determine the reflecting direction of the electromagnetic waves by changing the orientation of the reflecting surface of the pixel 12 between the first state and the second state to which the pixel 12 transitions. The first propagation unit 10 may include a mirror device such as a DMD or a MEMS (microelectromechanical systems) mirror. The pixels 12 may be a mirror element. The reference surface 11 may be an array surface of mirror elements.

The pixels 12 of the first propagation unit 10 may include respective shutters each of which includes a reflection surface to reflect electromagnetic waves. When the shutter is open, electromagnetic waves are transmitted and propagate in a predetermined direction. An opening state of the shutter is associated with the first state. When the shutter is closed, electromagnetic waves are reflected and propagate in a direction different from the predetermined direction. A closed state of the shutter is associated with the second state. In a case in which the pixels 12 include the respective shutters, the first propagation unit 10 may include a MEMS shutter including shutters that are arranged in an array along the reference surface 11 and can be controlled to open and close.

The pixels 12 of the first propagation unit 10 may include respective liquid crystal shutters. By controlling an alignment state of the liquid crystal, the liquid crystal shutter transitions to one of a transmission state to transmit electromagnetic waves or a reflection state to reflect the electromagnetic waves. Each the transmission state and the reflection state are associated with the first state and the second state, respectively.

The electromagnetic wave detection apparatus 1 may further include a first image forming unit 31. The first image forming unit 31 may form an image of an incident electromagnetic waves on the reference surface 11. That is, the first image forming unit 31 may be an optical member including an image forming point positioned on the reference surface 11. The first image forming unit 31 may be an optical member including at least one of a lens and a mirror. The first image forming unit 31 may form an image on the reference surface 11 by refracting the incident electromagnetic waves including the light flux 30a in a manner to narrow the light flux 30a.

The first detector 40 may include a first detection surface 41. The first detection surface 41 is also simply referred to as a detection surface. The first detector 40 may include at least one detection element on the first detection surface 41. The first detector 40 may detect electromagnetic waves incident on the first detection surface 41. The first detector 40 may detect an intensity of the electromagnetic waves incident on the first detection surface 41. In this case, the first detector 40 does not need to detect the electromagnetic waves as an image.

The first detector 40 may include detection elements arranged in an array along the first detection surface 41. The first detector 40 may include an imaging element such as, for example, an image sensor or an imaging array. In this case, the first detector 40 may capture an image formed from the electromagnetic waves incident on the first detection surface 41 and generate image information.

The first detector 40 may capture an image formed from visible light. The first detector 40 is not limited to capture an image formed from visible light and may capture an image formed from infrared light, ultraviolet, or other radio waves. The first detector 40 may include a distance measuring sensor. In a case in which the first detector 40 includes the distance measuring sensor, the electromagnetic wave detection apparatus 1 can acquire image-like distance information using the first detector 40. The first detector 40 may include a temperature sensor. In a case in which the first detector 40 includes the temperature sensor, the electromagnetic wave detection apparatus 1 can acquire image-like temperature information using the first detector 40.

The first detector 40 may include a single detection element. The single detection element may be an APD (avalanche photodiode), a PD (photodiode), a SPAD (Single-photon avalanche diode), a millimeter wave sensor, a submillimeter wave sensor, a distance measuring image sensor, or the like. The first detector 40 may include a detection element array. The detection element array may be an APD array, a PD array, an MPPC (Multi Photon Pixel Counter), a distance measuring imaging array, the distance measuring image sensor, or the like.

The electromagnetic wave detection apparatus 1 may further include a second image forming unit 32. The second image forming unit 32 may form an image of electromagnetic waves caused to be incident on the first detector 40 by the first propagation unit 10 and the second propagation unit 20, on the first detection surface 41. That is, the second image forming unit 32 may be an optical member having an image forming point positioned on the first detection surface 41. The second image forming unit 32 may be an optical member including at least one of a lens and a mirror. The second image forming unit 32 may form an image on the first detection surface 41 by refracting incident electromagnetic waves including the light flux 30a in a manner to narrow the light flux 30a. The first detector 40 may capture the image formed on the first detection surface 41 by the second image forming unit 32.

In a case in which the first detector 40 is configured using one element, an image of the electromagnetic waves does not need to be formed on the first detection surface 41. In this case, the first detector 40 does not need to be arranged at or near a secondary image forming position, which is an image forming position of the second image forming unit 32. That is, the first detector 40 may be arranged at any position that can cause electromagnetic waves emitted from the second propagation unit 20 to be incident on the first detection surface 41.

The electromagnetic wave detection apparatus 1 may further include a irradiator 62. The irradiator 62 radiates electromagnetic waves to the detection object 66 detected by the first detector 40. The first detector 40 may detect the detection object 66 by detecting reflected waves from the detection object 66. The irradiator 62 may radiate at least one of infrared light, visible light, ultraviolet, and radio waves. The irradiator 62 may include, for example, an LED (light-emitting diode), an LD (laser diode), or the like.

The electromagnetic wave detection apparatus 1 may map information detected from the detection object 66 by scanning the electromagnetic waves radiated from the irradiator 62. The irradiator 62 may scan the electromagnetic waves by employing a phased scan method to change a radiation direction of the electromagnetic waves by controlling a phase of a radiated electromagnetic waves. The electromagnetic wave detection apparatus 1 may further include a scanner 64 (see FIG. 3) configured to scan the electromagnetic waves radiated by the irradiator 62. The scanner 64 may include a scanning reflection surface to reflect the electromagnetic waves radiated by the irradiator 62 and scan the electromagnetic waves by changing an orientation of the scanning reflection surface. The scanner 64 may include at least one of a MEMS mirror, a polygon mirror, and a galvanometer mirror.

In a case in which the electromagnetic wave detection apparatus 1 radiates electromagnetic waves to the detection object 66 from the irradiator 62, the first detector 40 may be an active sensor configured to detect reflected waves of the electromagnetic waves radiated to the detection object 66 from the irradiator 62. The first detector 40 may be a passive sensor to detect electromagnetic waves incident from the detection object 66, regardless of whether the electromagnetic waves are radiated from the irradiator 62.

The second propagation unit 20 includes a first surface 21, a second surface 22, and a third surface 23. The first surface 21 opposes the reference surface 11 of the first propagation unit 10. The second surface 22 opposes the first detection surface 41 of the first detector 40. In a case in which the electromagnetic wave detection apparatus 1 includes the second image forming unit 32, the second surface 22 opposes the first detection surface 41 via the second image forming unit 32. The third surface 23 intersects each of the first surface 21 and the second surface 22.

The second propagation unit 20 may include a prism that has at least three surfaces. In this case, each of the first surface 21, the second surface 22, and the third surface 23 of the second propagation unit 20 may be associated with a surface of the prism. The second propagation unit 20 may be a triangle including the first surface 21, the second surface 22 and the third surface 23 as its sides in a plan view including the propagation axis 30 of the electromagnetic waves, as illustrated in FIG. 1 by way of example. The second propagation unit 20 may be a polygon such as a quadrangle that also has another surface as its side in a plan view including the propagation axis 30 of the electromagnetic waves. Each surface of the prism may be treated with antireflection coating or the like.

Each element of the electromagnetic wave detection apparatus 1 controls the propagation direction of the electromagnetic waves, whereby the electromagnetic waves can propagate along the propagation axis 30 illustrated in FIG. 1 by way of example.

The electromagnetic waves propagate in a first direction represented by D1 and are incident on the third surface 23. In a case in which the electromagnetic wave detection apparatus 1 includes the first image forming unit 31, the electromagnetic waves propagate in the first direction after passing through the first image forming unit 31 and are incident on the third surface 23. The third surface 23 causes the electromagnetic waves to propagate in a second direction represented by D2. That is, the electromagnetic waves are incident on the third surface 23 after propagating in the first direction and then propagate in the second direction. The electromagnetic waves can be refracted at the third surface 23 and change its propagation direction. That is, the first direction and the second direction may be different directions. When the electromagnetic waves are perpendicularly incident on the third surface 23, the electromagnetic waves can propagate straight without being refracted at the third surface 23. That is, the first direction and the second direction may be the same direction.

The electromagnetic waves propagate in the second direction within the second propagation unit 20 and exit from the first surface 21. The second direction may be orthogonal to the first surface 21. The electromagnetic waves then propagate to the reference surface 11 of the first propagation unit 10. That is, the first surface 21 emits the electromagnetic waves propagating in the second direction to the reference surface 11. The first surface 21 may be parallel to the reference surface 11. The propagation direction of the electromagnetic waves caused to be incident on the reference surface 11 by the first surface 21 may be orthogonal to the reference surface 11.

The electromagnetic waves are reflected by the pixels 12 of the first propagation unit 10 and re-enter the first surface 21. After re-entering the first surface 21, the electromagnetic waves propagate in a third direction represented by D3. The electromagnetic waves reflected by the pixels 12 propagate in the third direction when the pixels 12 transition to the first state. On the other hand, when the pixels 12 transition to the second state, the electromagnetic waves propagate in a direction represented by Dz and are emitted from the third surface 23, and do not reach the first detector 40.

The electromagnetic waves propagate in the third direction within the second propagation unit 20 and reaches the third surface 23. The electromagnetic waves are reflected by the third surface 23 and propagate in a fourth direction represented by D4. That is, the third surface 23 reflects the electromagnetic waves propagating in the third direction within the second propagation unit 20 and causes the electromagnetic waves to propagate in the fourth direction. The electromagnetic waves may undergo total reflection by the third surface 23. That is, the third surface 23 may cause total reflection of the electromagnetic waves propagating in the third direction within the second propagation unit 20.

The electromagnetic waves propagate in the fourth direction within the second propagation unit 20 and exit from the second surface 22. The fourth direction may be orthogonal to the second surface 22. The electromagnetic waves then propagate to the first detection surface 41 of the first detector 40. That is, the second surface 22 emits the electromagnetic waves propagating in the fourth direction to the first detection surface 41. The second surface 22 may be parallel to the first detection surface 41. The propagation direction of the electromagnetic waves emitted by the second surface 22 may be orthogonal to the first detection surface 41.

In a case in which the electromagnetic wave detection apparatus 1 includes the second image forming unit 32, the electromagnetic waves pass through the second image forming unit 32 after being emitted from the second surface 22 and are incident on the first detection surface 41. A principal plane of the second image forming unit 32 may be parallel to the first detection surface 41. The principal plane of the second image forming unit 32 may be parallel to the second surface 22.

As described above, the electromagnetic wave detection apparatus 1 can control whether to cause the electromagnetic waves incident from the third surface 23 to be incident on the first detection surface 41, by causing the pixels 12 of the first propagation unit 10 to transition to one of the first state or the second state.

Figure 2:
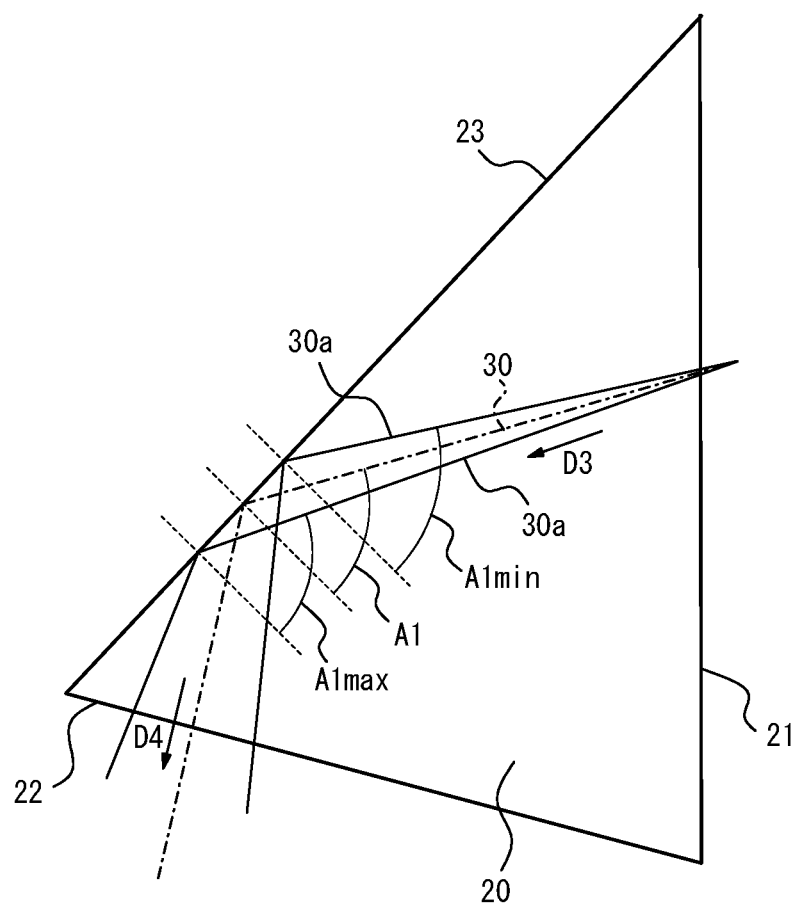
FIG. 2 is a diagram explaining incident angles of electromagnetic waves incident on a third surface.

Within the second propagation unit 20, as illustrated in FIG. 2, the electromagnetic waves propagating in the third direction represented by D3 along the propagation axis 30 are incident on the third surface 23 at an incident angle represented by A1. The third surface 23 corresponds to a boundary surface between the second propagation unit 20 and its externality. When μ represents a refractive index of the externality and α represents a refractive index of the second propagation unit 20, α>μ is satisfied. In a case in which the incident angle (A1) of the electromagnetic waves with respect to the third surface 23 is equal to or larger than a critical angle, the electromagnetic waves incident on the third surface 23 undergo total reflection by the third surface 23. When the critical angle in the example of FIG. 2 is represented by CA1, the following equation (1) is satisfied.

$$\sin(CA1) = \mu/\alpha \qquad (1)$$

Even when the electromagnetic waves are propagating along the propagation axis 30 as a whole, the electromagnetic waves may include a component propagating obliquely with respect to the propagation axis 30 within a range of the light flux 30a, in addition to a component propagating along the propagation axis 30. For example, the light flux 30a of the electromagnetic waves propagating in the third direction in FIG. 2 spreads as it propagates farther along the propagation axis 30. In this case, the electromagnetic waves can be incident on the third surface 23 at an incident angle within a range from an angle represented by A1min to an angle represented by A1max. In a case in which an angle from A1min to A1max is equal to or larger than the critical angle (CA1) based on the above equation (1), the electromagnetic waves incident on the third surface 23 undergo total reflection by the third surface 23. The second propagation unit 20 may be configured such that the incident angle (A1) of the electromagnetic waves is equal to or larger than the critical angle (CA1). For example, a value of the refractive index (α) of the second propagation unit 20 or an angle of the third surface 23 with respect to the first surface 21 may be determined such that the incident angle (A1) of the electromagnetic waves is equal to or greater than the critical angle (CA1).

Even when the first detector 40 does not detect the electromagnetic waves as an image, the electromagnetic wave detection apparatus 1 can acquire an image formed from the electromagnetic waves as image information by causing the plurality of pixels 12 of the first propagation unit 10 to transition to the first state one by one. For example, the electromagnetic wave detection apparatus 1 can detect the electromagnetic waves in one-dimension or two-dimension by synchronizing the state of the pixels 12 and the detection result by the first detector 40.

Figure 3:
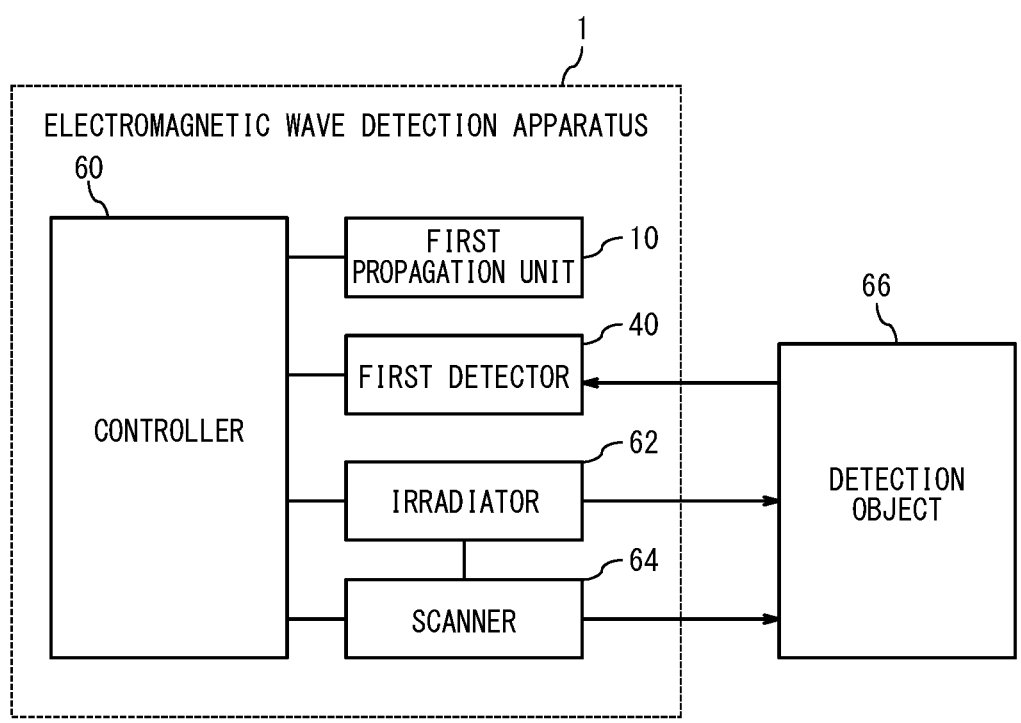
FIG. 3 is a block diagram illustrating an example configuration of the electromagnetic wave detection apparatus according to the first embodiment.

The electromagnetic wave detection apparatus 1 may further include a controller 60, as illustrated in FIG. 3. The controller 60 can control the propagation direction of the electromagnetic waves by controlling the first propagation unit 10. The controller 60 may acquire the detection result of the electromagnetic waves from the first detector 40. The controller 60 may acquire image information regarding an image formed from the electromagnetic waves from the first detector 40. The controller 60 may acquire the image information regarding the image formed from the electromagnetic waves by synchronizing the control of each of the pixels 12 of the first propagation unit 10 and the detection result acquired from the first detector 40. The controller 60 may control radiation or scanning of the electromagnetic waves by controlling the irradiator 62 or the scanner 64. The controller 60 may acquire the image information regarding the image formed from the electromagnetic waves, based on the control associated with the radiation or scanning of the electromagnetic waves and the detection result acquired from the first detector 40.

In a case in which the first detector 40 is a distance measuring sensor, the controller 60 may acquire distance information. The controller 60 may acquire the distance information regarding the detection object 66, based on the detection result acquired from the first detector 40, by employing a ToF (Time of Flight) method. The controller 60 may execute, as the ToF method, a DirectToF method that directly measures time from radiation of electromagnetic waves to detection of the reflected waves. As the ToF method, the controller 60 may execute a FlashToF method in which electromagnetic waves are periodically radiated and time from radiation of the electromagnetic waves to detection of the reflected waves is indirectly measured, based on a phase of the radiated electromagnetic waves and a phase of the reflected waves. The controller 60 may execute another method such as PhasedToF as the ToF method. The controller 60 may execute the ToF method by causing the irradiator 62 to radiate the electromagnetic waves.

The controller 60 may include, for example, a time measurement LSI (Large Scale Integrated circuit). The controller 60 may calculate, as a response time, time elapsed from time at which the electromagnetic waves are radiated by the irradiator 62 to time at which the reflected waves from the detection object 66 is detected by the first detector 40. The controller 60 may calculate a distance to the detection object 66, based on the response time. When the controller 60 causes the irradiator 62 or the scanner 64 to scan the electromagnetic waves, the controller 60 may create image-like distance information by synchronizing the radiation direction of the electromagnetic waves and the detection result acquired from the first detector 40.

In a case in which the first detector 40 is a temperature sensor, the controller 60 may acquire temperature information. The controller 60 may acquire information regarding the surroundings of the electromagnetic wave detection apparatus 1, based on the detection result of the electromagnetic waves acquired from the first detector 40. The information regarding the surroundings may include at least one of image information, distance information, and temperature information.

The controller 60 includes one or more processors and a memory. The processor may include at least one of a general purpose processor configured to read a specific program and perform a specific function and a specialized processor dedicated for specific processing. The specialized processor may include an ASIC (Application Specific Integrated Circuit). The processor may include a PLD (Programmable Logic Device). The PLD may include an FPGA (Field-Programmable Gate Array). The controller 60 may include at least one of a SoC (System-on-a-Chip) that includes one or more cooperating processors and a SiP (System in a Package).

Figure 4:
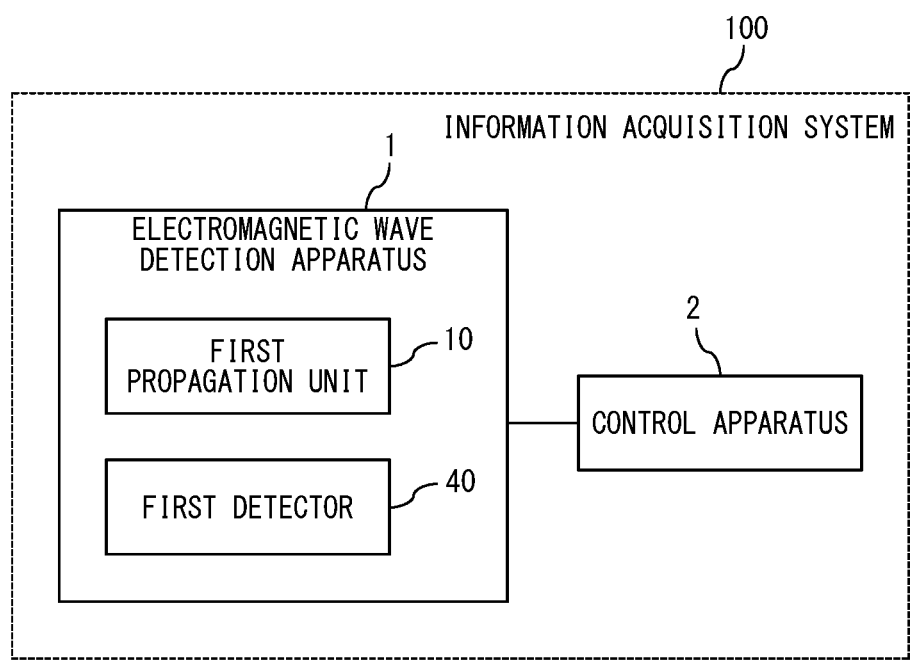
FIG. 4 is a block diagram illustrating an example configuration of an information acquisition system according to an embodiment.

An information acquisition system 100 according to the embodiment includes the electromagnetic wave detection apparatus 1 and a control apparatus 2, as illustrated in FIG. 4. The control apparatus 2 may acquire information regarding the surroundings of the electromagnetic wave detection apparatus 1, based on the detection result of the electromagnetic waves by the first detector 40. The information regarding the surroundings may include at least one of image information, distance information, and temperature information.

In the electromagnetic wave detection apparatus 1 according to the present embodiment, the third surface 23 of the second propagation unit 20 causes the electromagnetic waves incident thereon along the propagation axis 30 to propagate in the second direction and, simultaneously, reflects the electromagnetic waves propagating in the third direction and causes them to propagate to the second surface 22.

Figure 5:
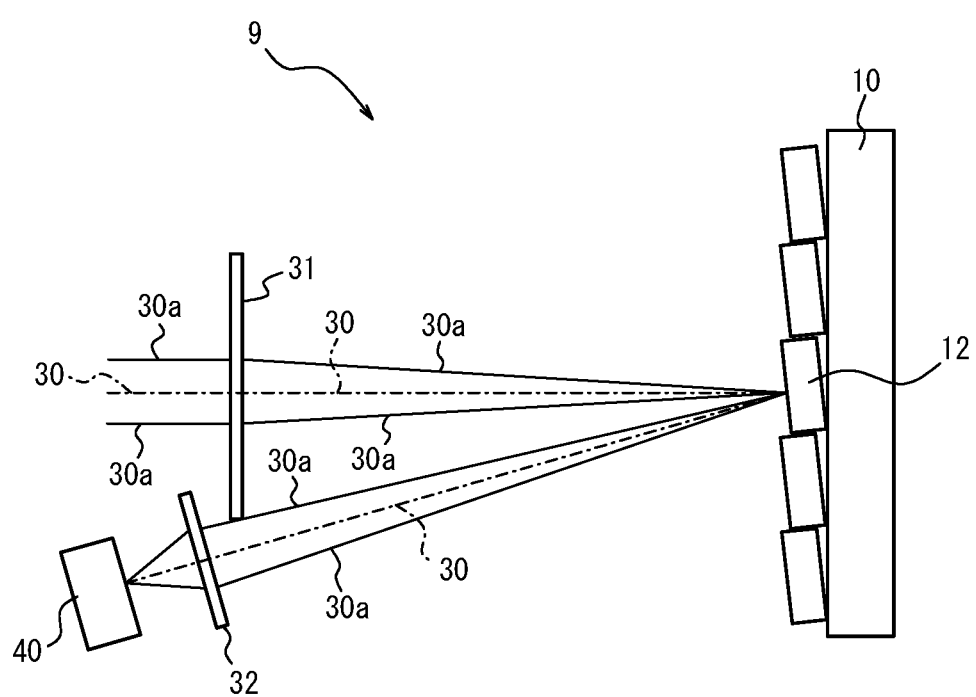
FIG. 5 is a diagram illustrating an example configuration of an electromagnetic wave detection apparatus according to a comparative example.

On the other hand, an electromagnetic wave detection apparatus 9 according to a comparative example illustrated in FIG. 5 does not include the second propagation unit 20. In the electromagnetic wave detection apparatus 9 according to the comparative example, the electromagnetic waves propagating along the propagation axis 30 are reflected by the first propagation unit 10 and incident on the first detector 40. In this case, the first detector 40 is positioned near the electromagnetic waves incident on the electromagnetic wave detection apparatus 9 and may affect the electromagnetic waves. In a case in which the electromagnetic wave detection apparatus 1 includes the second image forming unit 32, the second image forming unit 32 is positioned near the electromagnetic waves incident on the electromagnetic wave detection apparatus 9 and may affect the electromagnetic waves. In a case in which the electromagnetic wave detection apparatus 1 includes the first image forming unit 31, the first image forming unit 31 may affect the electromagnetic waves that are reflected by the first propagation unit 10 and propagate to the first detector 40. When the first detector 40 or the second image forming unit 32 affects the electromagnetic waves, a level of the electromagnetic waves incident on the first detector 40 may be reduced. If a back focus of the first image forming unit 31 is lengthened, the first detector 40 may be arranged apart from the first image forming unit 31. However, when the back focus of the first image forming unit 31 is lengthened, the size of the electromagnetic wave detection apparatus 9 is increased as a whole.

The electromagnetic wave detection apparatus 1 according to the present embodiment includes the second propagation unit 20 and thus can cause the electromagnetic waves to propagate to the second surface 22. In a case in which the electromagnetic waves propagate to the second surface 22, the first detector 40 can be arranged apart from the electromagnetic waves to be incident on the electromagnetic wave detection apparatus 1, in a manner different from the electromagnetic wave detection apparatus 9. In a case in which the electromagnetic wave detection apparatus 1 includes the first image forming unit 31, the second propagation unit 20 is provided in an area of the back focus of the first image forming unit 31, whereby the first detector 40 can be arranged apart from the first image forming unit 31, in a manner different from the electromagnetic wave detection apparatus 9. In this way, the level of the electromagnetic waves incident on the first detector 40 can be secured. In this case, the back focus of the first image forming unit 31 does not need to be longer than that of the electromagnetic wave detection apparatus 9. That is, the electromagnetic wave detection apparatus 1 includes the second propagation unit 20, whereby the electromagnetic wave detection apparatus 1 can be downsized as a whole and, further, can secure the level of the electromagnetic waves incident on the first detector 40. Because the electromagnetic wave detection apparatus 1 includes the second propagation unit 20, an influence on an incident electromagnetic waves can be reduced without increasing the size of the electromagnetic wave detection apparatus 1.

Figure 6:
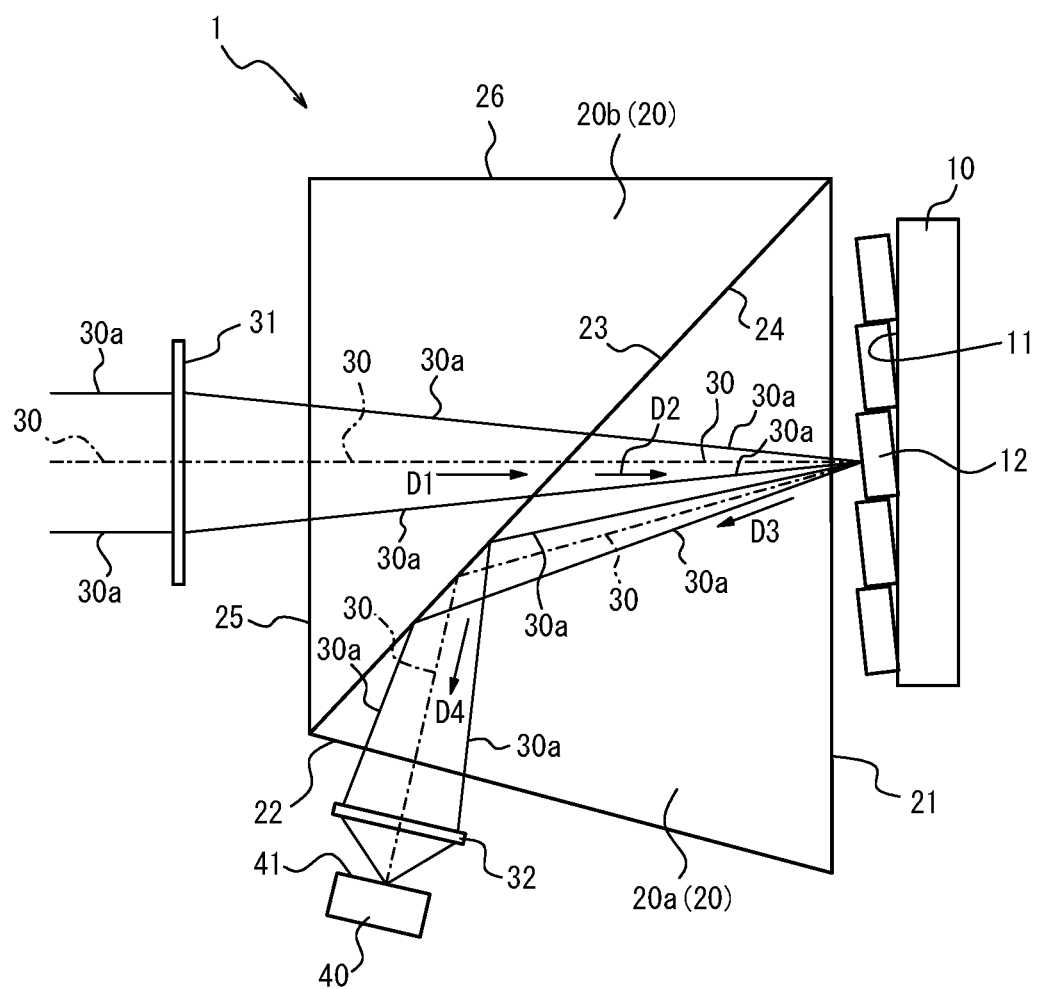
FIG. 6 is a diagram illustrating an example configuration in which a second propagation unit includes two prisms.

In the electromagnetic wave detection apparatus 1 according to the embodiment, the second propagation unit 20 may include a first prism 20a and a second prism 20b, as illustrated in FIG. 6. A refractive index of the second prism 20b is smaller than a refractive index of the first prism 20a. The first prism 20a includes a first surface 21, a second surface 22, and a third surface 23. The second prism 20b includes a fourth surface 24, a fifth surface 25, and a sixth surface 26. That is, each of the first prism 20a and the second prism 20b includes at least three surfaces. The fourth surface 24 of the second prism 20b forms a boundary surface between the first prism 20a and the second prism 20b, together with the third surface 23 of the first prism 20a. The fifth surface 25 of the second prism 20b intersects the direction in which the electromagnetic waves are incident on the second propagation unit 20. The sixth surface 26 of the second prism 20b intersects the fourth surface 24 and the fifth surface 25. The second prism 20b may be a triangle including the fourth surface 24, the fifth surface 25, and the sixth surface 26 as its sides in a plan view including the propagation axis 30 of the electromagnetic waves, as illustrated in FIG. 6 by way of example. The second prism 20b may be a polygon such as a quadrangle that also includes another surface as its side in a plan view including the propagation axis 30 of the electromagnetic waves.

The electromagnetic waves may propagate along the propagation axis 30 illustrated in FIG. 6 by way of example. The electromagnetic waves are incident on the fifth surface 25 of the second prism 20b. In a case in which the electromagnetic wave detection apparatus 1 includes the first image forming unit 31, the electromagnetic waves are incident on the fifth surface 25 after passing through the first image forming unit 31. The principal plane of the first image forming unit 31 may be parallel to the fifth surface 25. A direction in which the electromagnetic waves are caused to be incident on the fifth surface 25 by the first image forming unit 31 may be orthogonal to the fifth surface 25. The fifth surface 25 causes the incident electromagnetic waves to propagate in the first direction represented by D1. That is, the electromagnetic waves propagate in the first direction within the second prism 20b.

The electromagnetic waves propagating in the first direction exits from the fourth surface 24 and are then incident on the third surface 23 of the first prism 20a. That is, the electromagnetic waves pass through the boundary surface between the first prism 20a and the second prism 20b. The fourth surface 24 or the third surface 23 causes the electromagnetic waves to propagate in the second direction represented by D2. That is, the electromagnetic waves propagate in the second direction after passing through the boundary surface. The electromagnetic waves may be refracted at the boundary surface between the first prism 20a and the second prism 20b and change its propagation direction. That is, the first direction and the second direction may be different directions. When the electromagnetic waves are perpendicularly incident on the boundary surface, the electromagnetic waves can propagate straight without being refracted at the boundary surface. That is, the first direction and the second direction may be the same direction.

The electromagnetic waves propagating in the second direction within the first prism 20a can propagate along the propagation axis 30 and thus are emitted to and re-enter the first surface 21, reflected by the third surface 23, emitted from the second surface 22, and then incident on the first detection surface 41.

In a case in which the third surface 23 of the first prism 20a serves as a boundary surface between the first prism 20a and the second prism 20b, the critical angle of the electromagnetic waves incident on the third surface 23 is determined based on refractive indices of the first prism 20a and the second prism 20b. When β represents the refractive index of the first prism 20a and γ represents the refractive index of the second prism 20b, it is assumed that γ<β is satisfied. When CA2 represents the critical angle of the electromagnetic waves incident on the boundary surface between the first prism 20a and the second prism 20b, the following equation (2) is satisfied.

$$\sin(CA2) = \gamma/\beta \qquad (2)$$

As illustrated in FIG. 6 by way of example, because the second propagation unit 20 includes the second prism 20b, the third surface 23 of the first prism 20a can be protected. If a foreign matter such as water, oil, or dust adheres to the exterior of the third surface 23, it may hinder total reflection of the electromagnetic waves incident on the third surface 23 from the inside. By protecting the third surface 23, the condition for the total reflection on the third surface 23 can be maintained.

Figure 7:
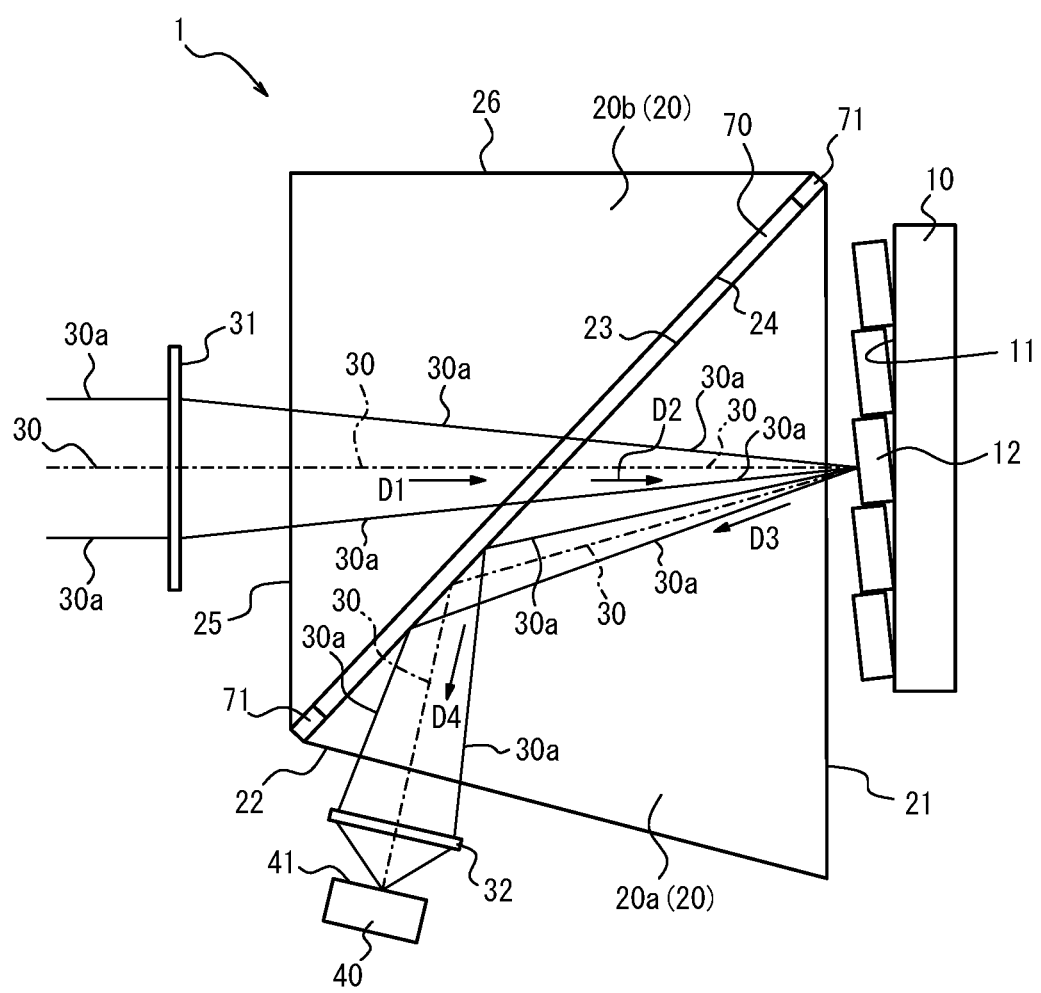
FIG. 7 is a diagram illustrating an example configuration in which the second propagation unit further includes an intermediate layer.

In the electromagnetic wave detection apparatus 1 according to the embodiment, as illustrated in FIG. 7, the second propagation unit 20 may further include an intermediate layer 70 positioned between the first prism 20a and the second prism 20b, in addition to the configuration illustrated in FIG. 6. The intermediate layer 70 may include at least one of vacuum, a gas, a liquid, a solid, and an amorphous. The intermediate layer 70 may include an air layer or a prism. A refractive index of the intermediate layer 70 is smaller than the refractive index of the first prism 20a. The refractive index of the second prism 20b may be the same as or different from the refractive index of the first prism 20a. The refractive index of the second prism 20b may be the same as or different from the refractive index of the intermediate layer 70. A spacer 71 is arranged to maintain a distance between the first prism 20a and the second prism 20b. That is, the spacer 71 is arranged to maintain a fixed thickness of the intermediate layer 70. In a case in which the intermediate layer 70 has a small fluidity or no fluidity at all, the spacer 71 may be omitted.

The third surface 23 of the first prism 20a forms a boundary surface between the first prism 20a and the intermediate layer 70. The fourth surface 24 of the second prism 20b forms a boundary surface between the second prism 20b and the intermediate layer 70.

The electromagnetic waves can propagate along the propagation axis 30 illustrated in FIG. 7 by way of example. The electromagnetic waves are incident on the fifth surface 25 of the second prism 20b. In a case in which the electromagnetic wave detection apparatus 1 includes the first image forming unit 31, the electromagnetic waves are incident on the fifth surface 25 after passing through the first image forming unit 31. The principal plane of the first image forming unit 31 may be parallel to the fifth surface 25. The direction in which the electromagnetic waves are caused to be incident on the fifth surface 25 by the first image forming unit 31 may be orthogonal to the fifth surface 25. The fifth surface 25 causes the incident electromagnetic waves to propagate in the first direction represented by D1. That is, the electromagnetic waves propagate in the first direction within the second prism 20b.

The electromagnetic waves propagating in the first direction exits from the fourth surface 24, passes through the intermediate layer 70, and are then incident on the third surface 23 of the first prism 20a. The third surface 23 causes the electromagnetic waves to propagate in the second direction represented by D2. That is, the electromagnetic waves propagate in the second direction after passing through the intermediate layer 70. The electromagnetic waves may be refracted at the boundary surface between the second prism 20b and the intermediate layer 70 and the boundary surface between the intermediate layer 70 and the first prism 20a and can change its propagation direction. The electromagnetic waves may propagate in the same direction as a result of the refraction at the boundary surface between the second prism 20b and the intermediate layer 70 and the boundary surface between the intermediate layer 70 and the first prism 20a. When the electromagnetic waves are perpendicularly incident on the boundary surface, the electromagnetic waves can propagate straight without being refracted at the boundary surface. That is, the first direction and the second direction may be the same direction.

The electromagnetic waves propagating in the second direction within the first prism 20a can propagate along the propagation axis 30 and thus are emitted to and re-enter the first surface 21, reflected by the third surface 23, emitted from the second surface 22, and then incident on the first detection surface 41.

In a case in which the third surface 23 of the first prism 20a serves as the boundary surface between the first prism 20a and the intermediate layer 70, the critical angle of the electromagnetic waves incident on the third surface 23 is determined based on the refractive indices of the first prism 20a and the intermediate layer 70. When β represents the refractive index of the first prism 20a and δ represents the refractive index of the intermediate layer 70, it is assumed that δ<β is satisfied. When CA3 represents the critical angle of the electromagnetic waves incident on the boundary surface between the first prism 20a and the intermediate layer 70, the following equation (3) is satisfied.

$$\sin(CA3)=\delta/\beta \quad (3)$$

Figure 8:
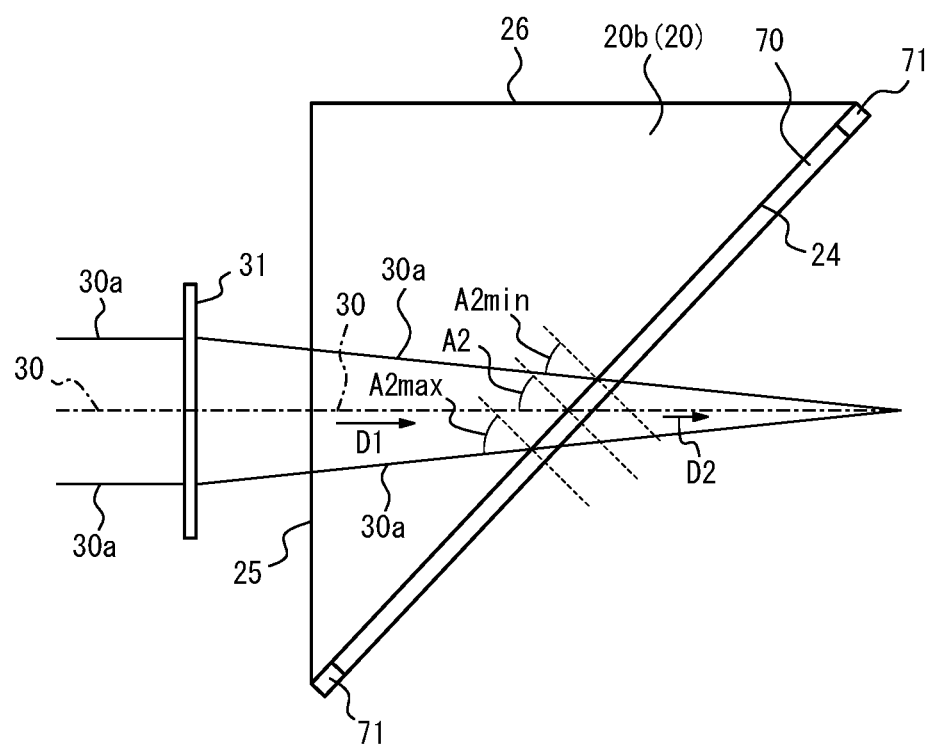
FIG. 8 is a diagram illustrating incident angles of electromagnetic waves with respect to a fourth surface.

In a case in which the refractive index of the second prism 20b is larger than the refractive index of the intermediate layer 70, the electromagnetic waves propagating from the second prism 20b to the intermediate layer 70 can undergo total reflection by the boundary surface. As illustrated in FIG. 8, the electromagnetic waves propagating in the first direction along the propagation axis 30 within the second prism 20b are incident on the fourth surface 24 at an incident angle represented by A2. When γ represents the refractive index of the second prism 20b and δ represents the refractive index of the intermediate layer 70, δ<γ is satisfied. When the incident angle (A2) of the electromagnetic waves on the fourth surface 24 is smaller than the critical angle, the electromagnetic waves incident on the fourth surface 24 can propagate to the intermediate layer 70 without undergoing total reflection by the fourth surface 24. When CA4 represents the critical angle in the example of FIG. 8, the following expression (4) is established.

$$\sin(CA4)=\delta/\gamma \quad (4)$$

The electromagnetic waves may include a component propagating within the range of the light flux 30a, in addition to a component propagating along the propagation axis 30. In FIG. 8, for example, the light flux 30a of the electromagnetic waves propagating in the first direction becomes narrower as the electromagnetic waves further propagate along the propagation axis 30. In this case, the electromagnetic waves can be incident on the fourth surface 24 at an incident angle within a range from an angle represented by A2min to an angle represented by A2max. When the angle from A2min to A2max is smaller than the critical angle (CA4) based on the above equation (4), the electromagnetic waves incident on the fourth surface 24 do not undergo total reflection by the fourth surface 24. In this case, that is, the electromagnetic waves having incident on the fourth surface 24 are likely to be emitted to the intermediate layer 70. The second propagation unit 20 may be configured such that the incident angle (A2) of the electromagnetic waves is smaller than the critical angle (CA4). For example, the value of the refractive index (α) of the second propagation unit 20 or the angle of the third surface 23 with respect to the first surface 21 may be determined such that the incident angle (A2) of the electromagnetic waves is smaller than the critical angle (CA4).

The configuration including the intermediate layer 70 between the first prism 20a and the second prism 20b as illustrated in FIG. 7 by way of example is also referred to as a total internal reflection prism. The total internal reflection prism is also called a TIR (TIR: Total Internal Reflection) prism. When the second propagation unit 20 includes the TIR prism as illustrated in FIG. 7 by way of example, a condition for total reflection on the third surface 23 is easily maintained. The intermediate layer 70 arranged between the first prism 20a and the second prism 20b can increase the flexibility of the refractive index and the shape of the second prism 20b.

SECOND EMBODIMENT

Elements denoted by the same reference numerals in the first and second embodiments may be configured in the same or similar manner. Electromagnetic waves can be detected by a plurality of sensors. In this case, when the plurality of sensors have different detection axes, coordinate systems of results detected as image or the like may be different between the sensors. It is required to reduce a difference in the coordinate systems of the detection results of the sensors. A difference in the coordinate systems of the detection results is not easily reduced by correction. Further, a correction itself of the coordinate system can be impossible. The electromagnetic wave detection apparatus 1 according to an embodiment of the present disclosure as illustrated in FIG. 9 includes a configuration to separate the electromagnetic waves incident on the second propagation unit 20 and thus can reduce a difference in the coordinate systems of the detection results by a plurality of sensors.

Figure 9:
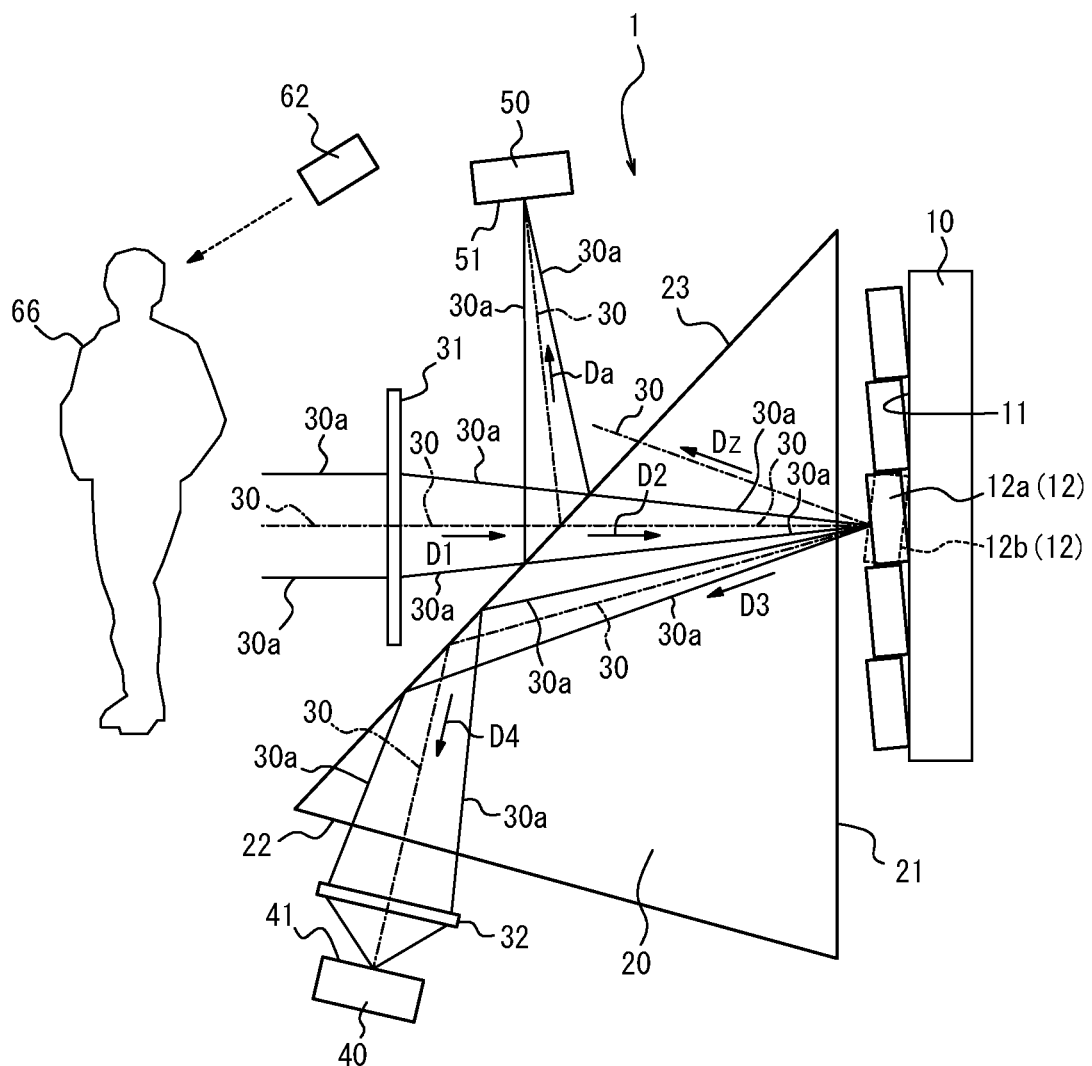
FIG. 9 is a diagram illustrating an example configuration of an electromagnetic wave detection apparatus according to a second embodiment.

The electromagnetic wave detection apparatus 1 according to the embodiment includes a first propagation unit 10, a second propagation unit 20, a first detector 40, and a second detector 50, as illustrated in FIG. 9. The first propagation unit 10, the second propagation unit 20, and the first detector 40 may be respectively configured to be the same as or similar to the first propagation unit 10, the second propagation unit 20, and the first detector 40 described in the first embodiment. The second detector 50 includes a second detection surface 51. The second detection surface 51 is also simply referred to as a detection surface. The second detector 50 may be configured to be the same as or similar to the first detector 40. The electromagnetic wave detection apparatus 1 detects electromagnetic waves incident from the detection object 66. The electromagnetic wave detection apparatus 1 controls a propagation direction of the electromagnetic waves using the first propagation unit 10 and the second propagation unit 20. The electromagnetic wave detection apparatus 1 causes the electromagnetic waves to propagate along, for example, the propagation axis 30 illustrated in FIG. 9. The propagation axis 30 corresponds to a principal ray at each angle of view, in a case in which the electromagnetic waves are light. The electromagnetic waves propagating along the propagation axis 30 have the predetermined spread range represented by the light flux 30a. The electromagnetic wave detection apparatus 1 causes the electromagnetic ways to be incident on each of the first detector 40 and the second detector 50 and detects the electromagnetic waves using each of the first detector 40 and the second detector 50.

The second propagation unit 20 includes a first surface 21, a second surface 22, and a third surface 23. The first surface 21 opposes the reference surface 11 of the first propagation unit 10. The second surface 22 opposes the first detection surface 41 of the first detector 40. In a case in which the electromagnetic wave detection apparatus 1 includes the second image forming unit 32, the second surface 22 opposes the first detection surface 41 via the second image forming unit 32. The third surface 23 intersects each of the first surface 21 and the second surface 22.

The second propagation unit 20 may include a prism including at least three surfaces. In this case, each of the first surface 21, the second surface 22, and the third surface 23 of the second propagation unit 20 may be associated with the surface of the prism. The second propagation unit 20 may be a triangle including the first surface 21, the second surface 22 and the third surface 23 as the three sides in a plan view including the propagation axis 30 of the electromagnetic waves, as illustrated in FIG. 1 by way of example. The second propagation unit 20 may be a polygon such as a quadrangle that also has another surface as a side in a plan view including the propagation axis 30 of the electromagnetic waves. Each surface of the prism may be treated with antireflection coating or the like.

The electromagnetic wave detection apparatus 1 may further include a first image forming unit 31. The electromagnetic wave detection apparatus 1 may further include a second image forming unit 32. The first image forming unit 31 and the second image forming unit 32 may be configured to be the same as or similar to the first image forming unit 31 and the second image forming unit 32, respectively, described in the first embodiment.

The electromagnetic wave detection apparatus 1 may further include a irradiator 62. The electromagnetic wave detection apparatus 1 may further include a scanner 64 (see FIG. 10). The irradiator 62 and the scanner 64 may be configured to be the same as or similar to the irradiator 62 and the scanner 64, respectively, described in the first embodiment. The irradiator 62 may include a first irradiator and a second irradiator. The first detector 40 may detect a reflected wave of the electromagnetic waves emitted from the first irradiator. The second detector 50 may detect reflected waves of the electromagnetic waves emitted from the second irradiator.

Each element of the electromagnetic wave detection apparatus 1 controls the propagation direction of the electromagnetic waves, whereby the electromagnetic waves can propagate along the propagation axis 30 illustrated in FIG. 9 by way of example.

The electromagnetic waves propagate in the first direction represented by D1 and are then incident on the third surface 23. In a case in which the electromagnetic wave detection apparatus 1 includes the first image forming unit 31, the electromagnetic waves propagate in the first direction represented by D1 after passing through the first image forming unit 31 and are then incident on the third surface 23. A part of the electromagnetic waves incident on the third surface 23 enters the second propagation unit 20. Another part of the electromagnetic waves incident on the third surface 23 is reflected by the third surface 23, propagates in the direction represented by Da, and is then incident on the second detection surface 51 of the second detector 50. That is, the third surface 23 separates the incident electromagnetic waves into electromagnetic waves to propagate in the second direction and electromagnetic waves to be incident on the second detection surface 51.

The third surface 23 causes a part of the incident electromagnetic waves to propagate in the second direction represented by D2. That is, a part of the electromagnetic waves that is propagating in the first direction and incident on the third surface 23 propagates in the second direction within the second propagation unit 20. The electromagnetic waves having entered the second propagation unit 20 may be refracted at the third surface 23 and change its propagation direction. That is, the first direction and the second direction may be different directions. When the electromagnetic waves are perpendicularly incident on the third surface 23, the electromagnetic waves can propagate straight without being refracted at the third surface 23. That is, the first direction and the second direction may be the same direction.

The electromagnetic waves having entered the second propagation unit 20 propagate in the second direction, exits from the first surface 21, and then propagate to the reference surface 11 of the first propagation unit 10. That is, the first surface 21 emits the electromagnetic waves propagating in the second direction to the reference surface 11.

The electromagnetic waves are reflected by the pixel 12 of the first propagation unit 10 and re-enter the first surface 21. After re-entering the first surface 21, the electromagnetic waves propagate in the third direction represented by D3. In a case in which the pixels 12 have transitioned to the first state, the electromagnetic waves reflected by the pixel 12 propagate in the third direction. On the other hand, in a case in which the pixels 12 have transitioned to the second state, the electromagnetic waves propagate in the direction represented by Dz and exit from the third surface 23, and do not reach the first detector 40.

The electromagnetic waves propagate in the third direction within the second propagation unit 20 and reaches the third surface 23. The electromagnetic waves are reflected by the third surface 23 and propagate in the fourth direction represented by D4. That is, the third surface 23 reflects the electromagnetic waves propagating in the third direction within the second propagation unit 20 and causes the electromagnetic waves to propagate in the fourth direction. The electromagnetic waves may undergo total reflection by the third surface 23. That is, the third surface 23 may cause total reflection of the electromagnetic waves propagating in the third direction within the second propagation unit 20.

The electromagnetic waves propagate in the fourth direction within the second propagation unit 20, exit from the second surface 22, and propagate to the first detection surface 41 of the first detector 40. That is, the second surface 22 emits the electromagnetic waves propagating in the fourth direction to the first detection surface 41. In a case in which the electromagnetic wave detection apparatus 1 includes the second image forming unit 32, the electromagnetic waves exit from the second surface 22, pass through the second image forming unit 32, and are then incident on the first detection surface 41. The first detector 40 detects the electromagnetic waves incident on the first detection surface 41.

As described above, the electromagnetic wave detection apparatus 1 transitions the pixels 12 of the first propagation unit 10 to one of the first state and the second state and thus can control whether to cause the electromagnetic waves incident on the second propagation unit 20 from the third surface 23 to be incident on the first detection surface 41.

On the other hand, the third surface 23 reflects a part of the incident electromagnetic waves, causes the electromagnetic waves to propagate in the direction represented by Da and to be incident on the second detection surface 51 of the second detector 50. That is, the part of the electromagnetic waves propagating in the first direction and incident on the third surface 23 is then incident on the second detection surface 51. The second detector 50 detects the electromagnetic waves incident on the second detection surface 51.

In a case in which the electromagnetic wave detection apparatus 1 includes the first image forming unit 31, the first image forming unit 31 forms an image of an incident electromagnetic waves. The first image forming unit 31 forms an image of the electromagnetic waves entering the second propagation unit 20 from the third surface 23 on the reference surface 11 of the first propagation unit 10. The first image forming unit 31 forms, on the second detection surface 51, an image of the electromagnetic waves that has been reflected by the third surface 23, propagated in the direction represented by Da, and then incident on the second detection surface 51 of the second detector 50. In other words, the second detector 50 is arranged at a position such that the electromagnetic waves pass through the first image forming unit 31, are reflected by the third surface 23, and propagate in the direction represented by Da, and then form an image on the second detection surface 51.

The image formed on the second detection surface 51 of the second detector 50 may be the same as or similar to the image formed on the reference surface 11 of the first propagation unit 10. In a case in which the second detector 50 includes detection elements arranged in an array, the second detector 50 may detect an image that is the same as or similar to the image formed on the reference surface 11 of the first propagation unit 10.

The third surface 23 may reflect the electromagnetic waves at a predetermined reflectance. If the predetermined reflectance is fixed regardless of the wavelength of the electromagnetic waves, the image detected on the second detection surface 51 of the second detector 50 can be an image simply having different intensity of the electromagnetic waves by a predetermined ratio with respect to the image formed on the reference surface 11 of the first propagation unit 10.

The third surface 23 may reflect the electromagnetic waves at a reflectance determined based on the wavelength of the electromagnetic waves and cause the electromagnetic waves to propagate in the direction represented by Da and to be incident on the second detection surface 51 of the second detector 50. In other words, the third surface 23 may transmit the electromagnetic waves with the transmittance determined based on the wavelengths of the electromagnetic waves and cause the electromagnetic waves to enter the second propagation unit 20.

For example, the third surface 23 may reflect electromagnetic waves having wavelengths within a predetermined range at a reflectance of a predetermined value or more and reflect electromagnetic waves having wavelengths out of the predetermined range at a reflectance of smaller than the predetermined value. This facilitates incident of electromagnetic waves having wavelengths within the predetermined range on the second detection surface 51 of the second detector 50. On the other hand, this enables electromagnetic waves having wavelengths out of the predetermined range to easily enter the second propagation unit 20. As a result, electromagnetic waves can be separated based on their wavelengths. That is, the third surface 23 can separate electromagnetic waves, based on wavelengths of the electromagnetic waves.

The predetermined range may be a value equal to or larger than a predetermined wavelength or a range specified as a value larger than the predetermined wavelength. The predetermined range may be a value equal to or smaller than the predetermined wavelength or a value specified as a value smaller than the predetermined wavelength. The predetermined range may be a range specified as a value equal to or larger than a first predetermined wavelength and equal to or smaller than a second predetermined wavelength. The predetermined range may be a range specified as a value equal to or smaller than the first predetermined wavelength or equal to or larger than the second predetermined wavelength.

The third surface 23 separates the electromagnetic waves based on the wavelength, whereby images that are formed by electromagnetic waves having different wavelengths and the same coordinates within the images may be formed on the second detection surface 51 of the second detector 50 and the reference surface 11 of the first propagation unit 10. In a case in which the coordinates of the images formed on the second detection surface 51 and the reference surface 11 coincide with each other, the image information detected by the first detector 40 or the image-like distance information or the image-like temperature information can be easily superimposed on the image information detected by the first detector 40. Further, because the third surface 23 separates the electromagnetic waves based on the wavelength, each of the first detector 40 and the second detector 50 can serve as a sensor to detect electromagnetic waves having specific wavelengths. That is, the first detector 40 and the second detector 50 may include respective sensors of different types. The first detector 40 and the second detector 50 may include respective sensors of the same type.

A difference between a length of the propagation path of the electromagnetic waves from the third surface 23 to the second detection surface 51 and a length of the propagation path of the electromagnetic waves from the third surface 23 to the reference surface 11 may be a predetermined value or smaller. In a case in which the electromagnetic wave detection apparatus 1 includes the first image forming unit 31, when a difference between the length of the propagation paths of the electromagnetic waves is equal to or smaller than the predetermined value, an image can be easily formed on each of the reference surface 11 and the second detection surface 51 by the first image forming unit 31. Also, when the difference between the length of the propagation paths of the electromagnetic waves is equal to or smaller than the predetermined value, a difference in focusing of an image formed on the reference surface 11 and that of an image formed on the second detection surface 51 can be reduced. The length of the propagation path of the electromagnetic waves from the third surface 23 to the second detection surface 51 and the length of the propagation path of the electromagnetic waves from the third surface 23 to the reference surface 11 may be the same. The length of the propagation path of the electromagnetic waves may correspond to a distance over which the electromagnetic waves actually propagate or a length of an optical path calculated by multiplying the distance over which the electromagnetic waves propagate by a refractive index of a material through which the electromagnetic waves propagate.

Figure 10:
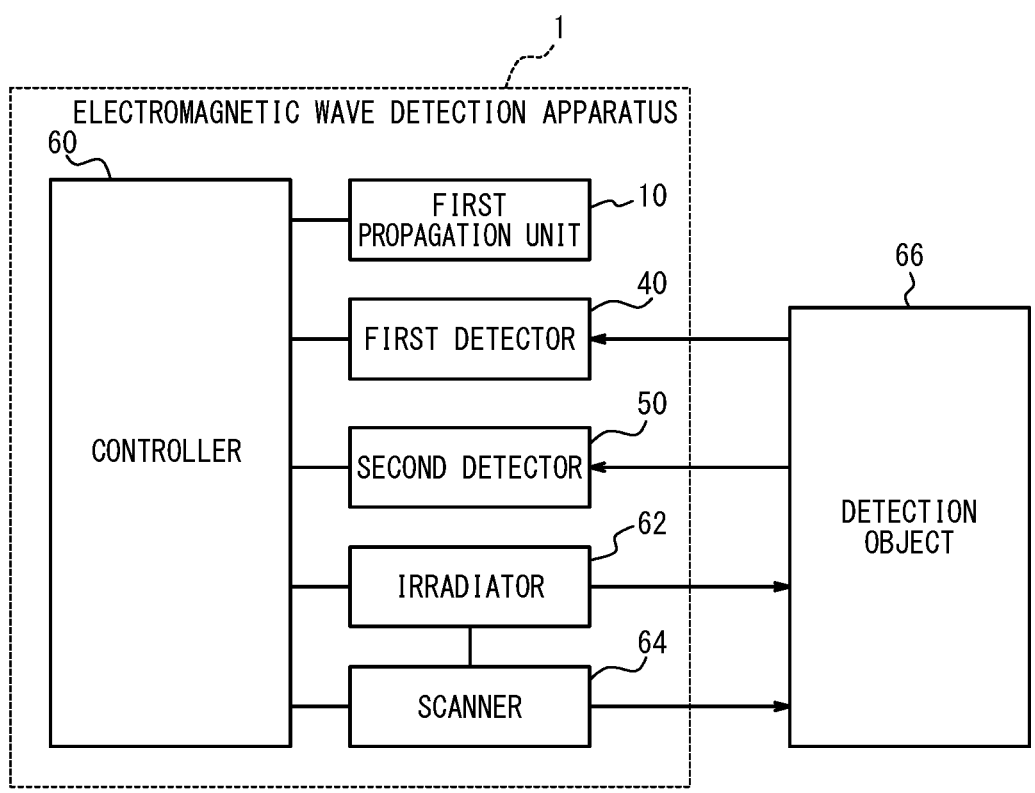
FIG. 10 is a block diagram illustrating an example configuration of the electromagnetic wave detection apparatus according to the second embodiment.

The electromagnetic wave detection apparatus 1 may further include a controller 60, as illustrated in FIG. 10. The controller 60 may be configured to be the same as or similar to the controller 60 described in the first embodiment. The controller 60 can control the propagation direction of the electromagnetic waves by controlling the first propagation unit 10. The controller 60 may acquire a detection result of the electromagnetic waves from the first detector 40. The controller 60 may acquire image information regarding an image formed from the electromagnetic waves from the first detector 40. The controller 60 may acquire the image information regarding the image formed from the electromagnetic waves by synchronizing the control of each of the pixels 12 of the first propagation unit 10 and the detection result acquired from the first detector 40. The controller 60 may control the irradiator 62 or the scanner 64 to control radiation or scanning of the electromagnetic waves. The controller 60 may acquire the image information regarding the image formed from the electromagnetic waves, based on the control associated with the radiation or scanning of the electromagnetic waves and the detection result acquired from the first detector 40. In a case in which the irradiator 62 includes the first irradiator and the second irradiator, the controller 60 may cause each of the first irradiator and the second irradiator to radiate electromagnetic waves.

Figure 11:
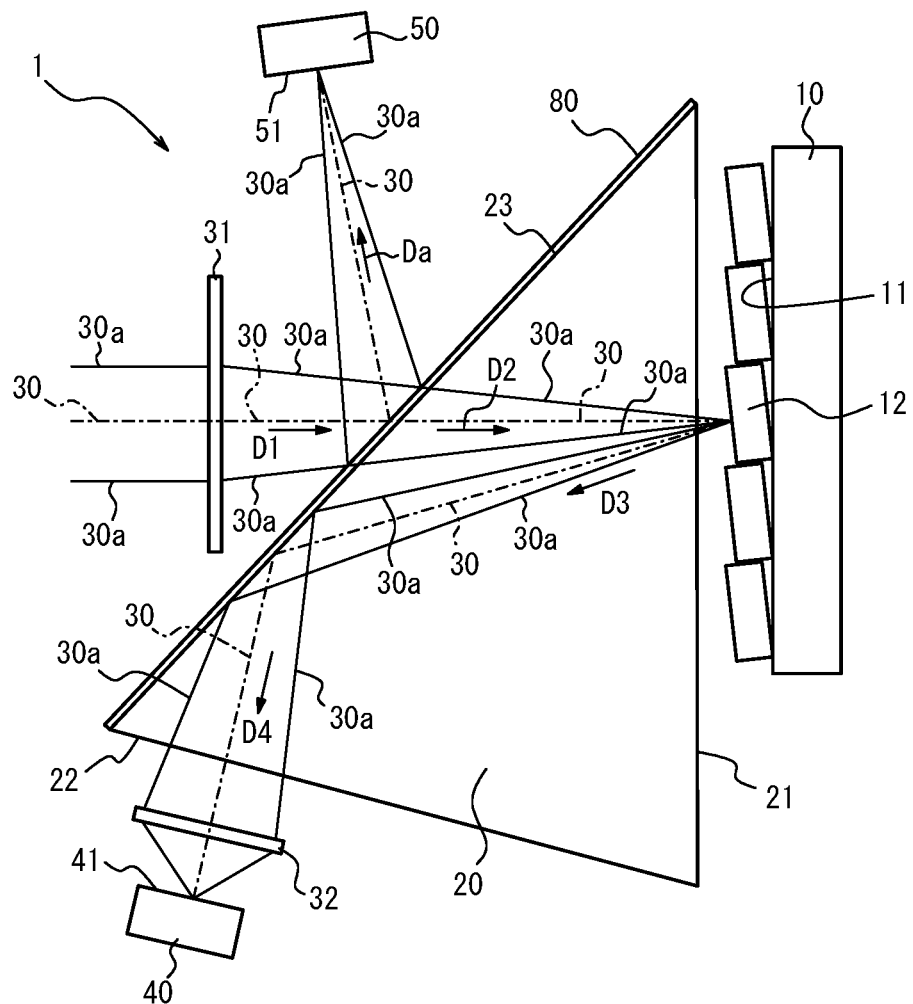
FIG. 11 is a diagram illustrating an example configuration in which the second propagation unit further includes a separator.

In the electromagnetic wave detection apparatus 1 according to the embodiment, as illustrated in FIG. 11, the second propagation unit 20 may further include a separator 80 arranged along the third surface 23, in addition to the configuration illustrated in FIG. 9. The separator 80 may be arranged on the third surface 23. In a case in which the separator 80 is arranged on the third surface 23, the third surface 23 forms a boundary surface between the prism forming the second propagation unit 20 and the separator 80.

The separator 80 may include at least one of a visible light reflection coating, a half mirror, a beam splitter, a dichroic mirror, a cold mirror, a hot mirror, a meta surface, and a deflecting element.

In a case in which the separator 80 is arranged on the third surface 23, the refractive index of the prism forming the second propagation unit 20 is larger than the refractive index of the separator 80. This can enable the presence of the critical angle when electromagnetic waves propagating within the second propagation unit 20 are incident on the third surface 23. That is, the electromagnetic waves propagating within the second propagation unit 20 can undergo total reflection by the third surface 23.

The separator 80 may reflect the electromagnetic waves at a predetermined reflectance. If the predetermined reflectance is fixed regardless of the wavelength of the electromagnetic waves, the image detected on the second detection surface 51 of the second detector 50 can simply have a different intensity of the electromagnetic waves by a predetermined ratio with respect to the image formed on the reference surface 11 of the first propagation unit 10.

The separator 80 may reflect the electromagnetic waves at a reflectance determined based on the wavelength of the electromagnetic waves, and cause the electromagnetic waves to propagate in the direction represented by Da and to be incident on the second detection surface 51 of the second detector 50. In other words, the separator 80 may transmit the electromagnetic waves with the transmittance determined based on the wavelength of the electromagnetic waves and cause the electromagnetic waves to pass through the third surface 23 and to enter the second propagation unit 20.

For example, the separator 80 may reflect electromagnetic waves having wavelengths within a predetermined range with a reflectance of a predetermined value or larger, and may reflect electromagnetic waves having wavelengths out of the predetermined range with a reflectance of smaller than the predetermined value. This facilitates incident of the electromagnetic waves having wavelengths within the predetermined range on the second detection surface 51 of the second detector 50. On the other hand, this enables the electromagnetic waves having wavelengths out of the predetermined range to enter the second propagation unit 20. As a result, the electromagnetic waves can be separated based on their wavelengths. That is, the separator 80 can separate electromagnetic waves based on their wavelengths.

The predetermined range may be a value equal to or larger than a predetermined wavelength or a value within a range specified as a value that is larger than the predetermined wavelength. The predetermined range may be a range specified as a value equal to or smaller than the predetermined wavelength or a value smaller than the predetermined wavelength. The predetermined range may be a range specified as a value equal to or larger than a first predetermined wavelength and equal to or smaller than a second predetermined wavelength. The predetermined range may be a range specified as a value equal to or smaller than the first predetermined wavelength or equal to or larger than the second predetermined wavelength.

The separator 80 separates electromagnetic waves based on the wavelengths, whereby images formed from electromagnetic waves having different wavelengths and the same coordinates within the images can be respectively formed on the second detection surface 51 of the second detector 50 and on the reference surface 11 of the first propagation unit 10. When the coordinates of the images formed on the second detection surface 51 and the reference surface 11 coincide with each other, the image information detected by the first detector 40 or the image-like distance information or the image-like temperature information can be easily superimposed on the image information detected by the second detector 50. Further, because the separator 80 separates electromagnetic waves based on the wavelengths, each of the first detector 40 and the second detector 50 can be configured as a sensor to detect electromagnetic waves having particular wavelengths.

The electromagnetic waves can propagate along the propagation axis 30 illustrated in FIG. 11 by way of example. The electromagnetic waves having propagated in the first direction are then incident on the separator 80. In a case in which the electromagnetic wave detection apparatus 1 includes the first image forming unit 31, the electromagnetic waves are incident on the separator 80 after passing through the first image forming unit 31.

A part of the electromagnetic waves incident on the separator 80 passes through the third surface 23 and enters the second propagation unit 20. Another part of the electromagnetic waves incident on the third surface 23 is reflected by the separator 80, propagates in the direction represented by Da, and is then incident on the second detection surface 51 of the second detector 50. That is, the separator 80 separates the incident electromagnetic waves into the electromagnetic waves propagating in the second direction and the electromagnetic waves to be incident on the second detection surface 51.

The electromagnetic waves incident on the second propagation unit 20 after passing through the separator 80 and the third surface 23 propagate in the second direction. The electromagnetic waves having entered the second propagation unit 20 may be refracted at the third surface 23 and change its propagation direction. That is, the first direction and the second direction may be different directions. When the electromagnetic waves are perpendicularly incident on the third surface 23, the electromagnetic waves can propagate straight without being refracted at the third surface 23. That is, the first direction and the second direction may be the same direction.

The electromagnetic waves propagating in the second direction within the prism that constitutes the second propagation unit 20 can propagate along the propagation axis 30, and thus are emitted to and re-enter the first surface 21, exit from the second surface 22, and then incident on the first detection surface 41.

In a case in which the third surface 23 of the second propagation unit 20 serves as the boundary surface between the third surface 23 and the separator 80, the critical angle of the electromagnetic waves incident on the third surface 23 depends on the refractive indices of the prism constituting the second propagation unit 20 and the separator 80. It is assumed that when α represents the refractive index of the prism constituting the second propagation unit 20 and ε represents the refractive index of the separator 80, ε<α is satisfied. When CA5 represents the critical angle of the electromagnetic waves incident on the boundary surface between the prism constituting the second propagation unit 20 and the separator 80, the following formula (5) is satisfied.

$$\sin(CA5) = \varepsilon/\alpha \tag{5}$$

As illustrated in FIG. 11 by way of example, because the second propagation unit 20 includes the separator 80, electromagnetic waves incident on the electromagnetic wave detection apparatus 1 can be easily separated in accordance with their wavelengths.

Figure 12:
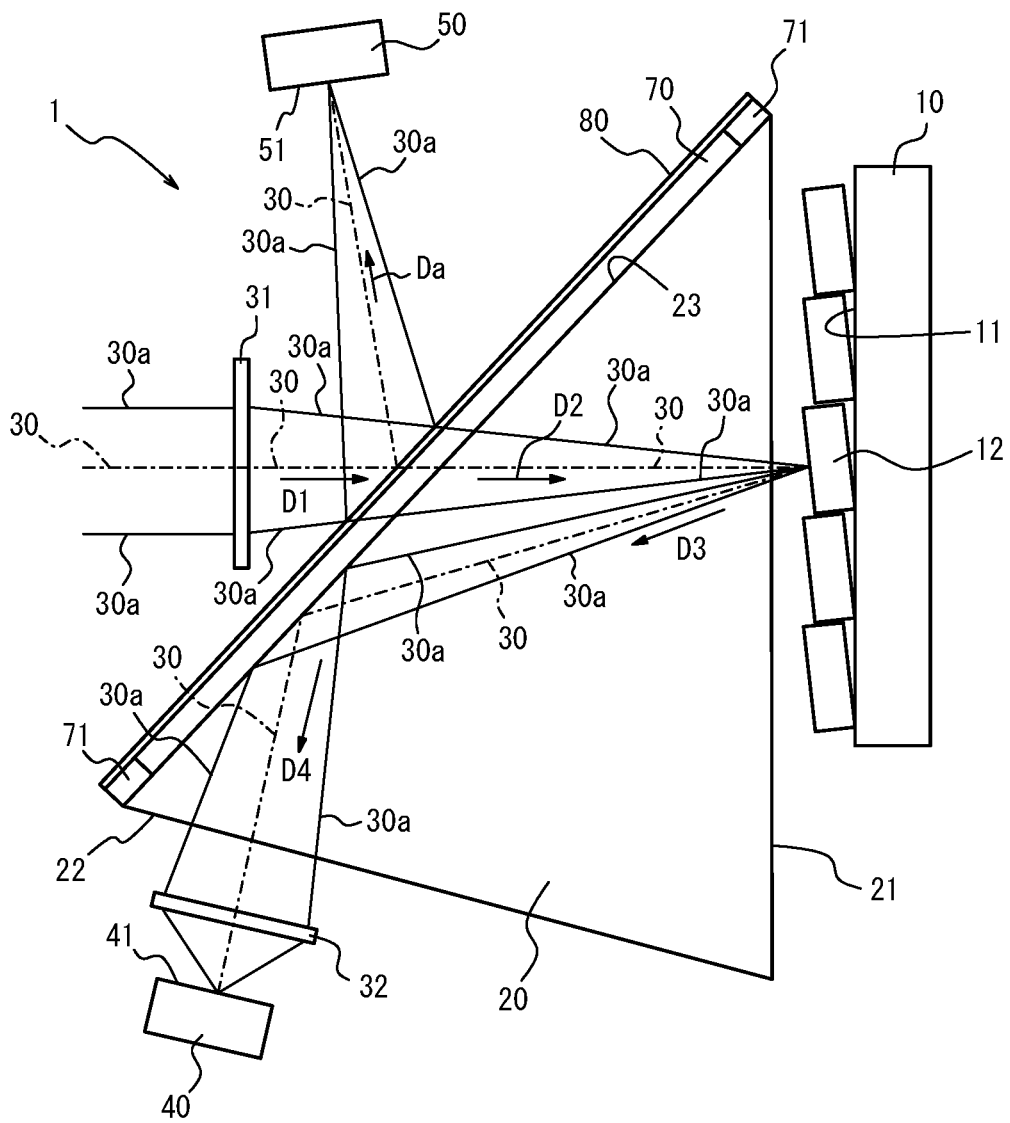
FIG. 12 is a diagram illustrating an example configuration in which the second propagation unit includes the separator and an intermediate layer.

In the electromagnetic wave detection apparatus 1 according to the embodiment, as illustrated in FIG. 12, the second propagation unit 20 may further include an intermediate layer 70 between the third surfaced 23 and the separator 80, in addition to the configuration illustrated in FIG. 11 by way of example. The third surface 23 forms a boundary surface between the prism constituting the second propagation unit 20 and the intermediate layer 70. The intermediate layer 70 may include at least one of vacuum, a gas, a liquid, a solid, and an amorphous. The intermediate layer 70 may include an air layer or a prism. A refractive index of the prism constituting the second propagation unit 20 is larger than the refractive index of the intermediate layer 70. This can enable the presence of the critical angle when the electromagnetic waves propagating within the second propagation unit 20 are incident on the third surface 23. That is, the electromagnetic waves propagating within the second propagation unit 20 can undergo total reflection by the third surface 23. The refractive index of the separator 80 may be the same as or different from the refractive index of the prism constituting the second propagation unit 20. The refractive index of the separator 80 may be the same as or different from the refractive index of the intermediate layer 70. The spacer 71 is arranged to maintain a fixed distance between the first prism 20a and the second prism 20b. That is, the spacer 71 is arranged to maintain a fixed thickness of the intermediate layer 70. In a case in which the intermediate layer 70 has no fluidity or small fluidity, the spacer 71 may be omitted.

The electromagnetic waves can propagate along the propagation axis 30 illustrated in FIG. 12 by way of example. The electromagnetic waves propagating in the first direction are incident on the separator 80. In a case in which the electromagnetic wave detection apparatus 1 includes the first image forming unit 31, the electromagnetic waves are incident on the separator 80 after passing through the first image forming unit 31.

A part of the electromagnetic waves incident on the separator 80 enters the intermediate layer 70. Another part of the electromagnetic waves incident on the separator 80 is reflected by the separator 80, propagates in the direction represented by Da, and is then incident on the second detection surface 51 of the second detector 50. That is, the separator 80 separates the incident electromagnetic waves into the electromagnetic waves to enter the intermediate layer 70 and the electromagnetic waves to be incident on the second detection surface 51.

The electromagnetic waves incident on the intermediate layer 70 pass through the intermediate layer 70 and are then incident on the third surface 23. The third surface 23 causes the electromagnetic waves to propagate in the second direction represented by D2. That is, the electromagnetic waves propagate in the second direction after passing through the intermediate layer 70. The electromagnetic waves can be refracted at the boundary surface between the separator 80 and the intermediate layer 70 and at the third surface 23 and change its propagation direction. The electromagnetic waves may propagate in the same direction as a result, after being refracted at the boundary surface between the separator 80 and the intermediate layer 70 and at the third surface 23. When the electromagnetic waves are perpendicularly incident on the boundary surface, the electromagnetic waves can propagate straight without being refracted at the boundary surface. That is, the first direction and the second direction may be the same direction.

The electromagnetic waves propagating in the second direction within the prism constituting the second propagation unit 20 can propagate along the propagation axis 30, and thus are emitted to and re-enter the first surface 21, reflected by the third surface 23, exiting from the second surface 22, and then incident on the first detection surface 41.

Because the intermediate layer 70 is arranged between the third surface 23 and the separator 80, the flexibility of the refractive index of the separator 80 can be increased.

Figure 13:
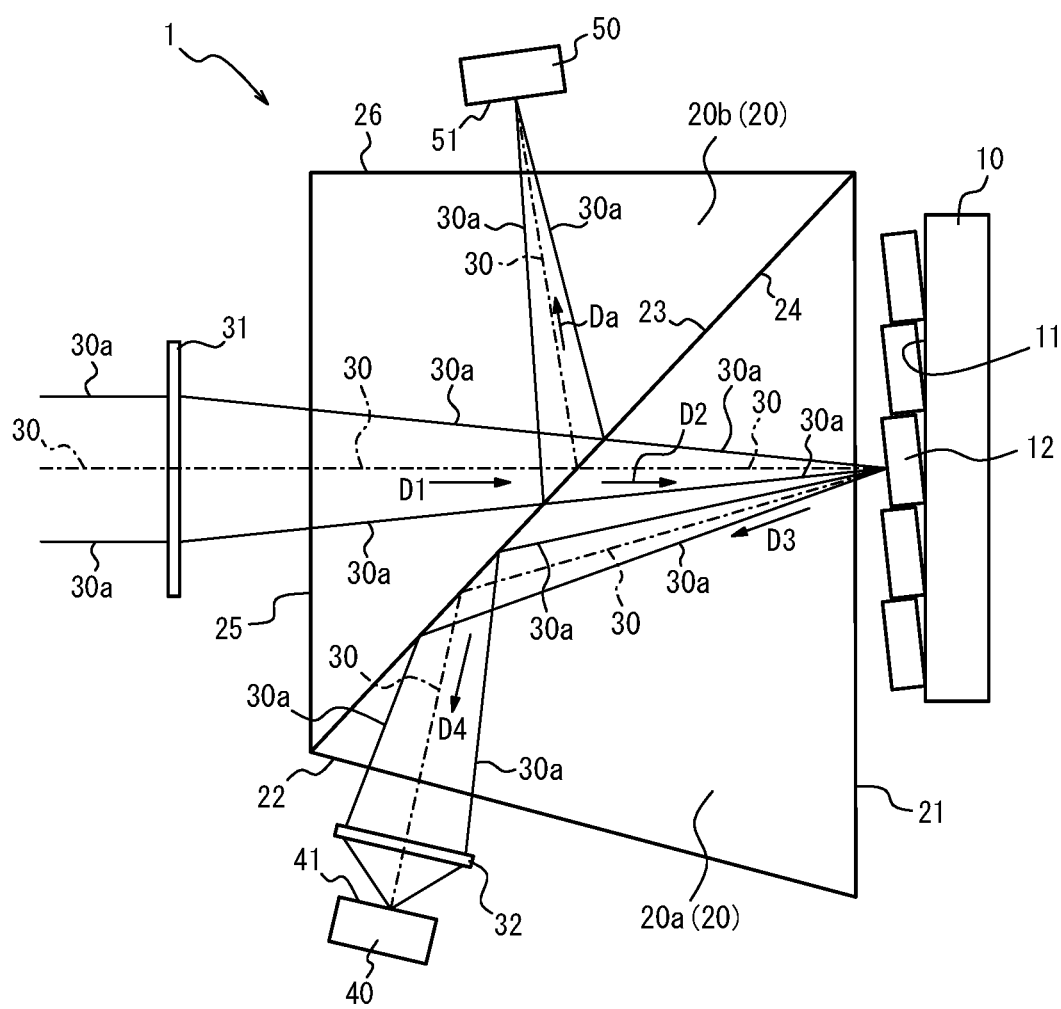
FIG. 13 is a diagram illustrating an example configuration in which the second propagation unit includes two prisms.

In the electromagnetic wave detection apparatus 1 according to the embodiment, the second propagation unit 20 may include a first prism 20a and a second prism 20b, as illustrated in FIG. 13. The refractive index of the second prism 20b is smaller than the refractive index of the first prism 20a. This can enable the presence of the critical angle when electromagnetic waves propagating within the first prism 20a are incident on the third surface 23. That is, the electromagnetic waves propagating within the first prism 20a can undergo total reflection by the third surface 23. The first prism 20a includes a first surface 21, a second surface 22, and a third surface 23. The second prism 20b includes a fourth surface 24, a fifth surface 25, and a sixth surface 26. That is, each of the first prism 20a and the second prism 20b includes at least three surfaces. The fourth surface 24 of the second prism 20b forms a boundary surface between the first prism 20a and the second prism 20b together with the third surface 23 of the first prism 20a. The fifth surface 25 of the second prism 20b intersects the direction in which the electromagnetic waves are incident on the second propagation unit 20. The sixth surface 26 of the second prism 20b intersects the fourth surface 24 and the fifth surface 25. The second prism 20*b* may be a triangle including the fourth surface 24, the fifth surface 25, and the sixth surface 26 as its sides in a plan view including the propagation axis 30 of the electromagnetic waves, as illustrated in FIG. 6 by way of example. The second prism 20*b* may include a polygonal shape such as a quadrangle that also has another surface as its side in a plan view including the propagation axis 30 of the electromagnetic waves.

The electromagnetic waves can propagate along the propagation axis 30 illustrated in FIG. 13 by way of example. The electromagnetic waves are incident on the fifth surface 25 of the second prism 20*b*. In a case in which the electromagnetic wave detection apparatus 1 includes the first image forming unit 31, the electromagnetic waves are incident on the fifth surface 25 after passing through the first image forming unit 31. The principal plane of the first image forming unit 31 may be parallel to the fifth surface 25. The direction in which the first image forming unit 31 causes the electromagnetic waves to be incident on the fifth surface 25 may be orthogonal to the fifth surface 25. The fifth surface 25 causes the incident electromagnetic waves to propagate in the first direction represented by D1. That is, the electromagnetic waves propagate in the first direction within the second prism 20*b*.

The electromagnetic waves propagating in the first direction exit from the fourth surface 24 and are then incident on the third surface 23 of the first prism 20*a*. A part of the electromagnetic waves incident on the third surface 23 is then incident on the first prism 20*a*. Another part of the electromagnetic waves incident on the third surface 23 is reflected by the third surface 23, exits from the sixth surface 26 of the second prism 20*b*, and is then incident on the second detection surface 51 of the second detector 50. That is, the separator 80 separates the incident electromagnetic waves into the electromagnetic waves to be incident on first prism 20*a* and the electromagnetic waves to be incident on the second detection surface 51.

The third surface 23 causes the electromagnetic waves to propagate in the second direction represented by D2. That is, the electromagnetic waves propagate in the second direction after passing through the boundary surface formed by the fourth surface 24 and the third surface 23. The electromagnetic waves may be refracted at the boundary surface between the first prism 20*a* and the second prism 20*b* and change its propagation direction. That is, the first direction and the second direction may be different directions. When the electromagnetic waves are perpendicularly incident on the boundary surface, the electromagnetic waves can propagate straight without being refracted at the boundary surface. That is, the first direction and the second direction may be the same direction.

The electromagnetic waves propagating in the second direction within the first prism 20*a* can propagate along the propagation axis 30, and thus are emitted to and re-enter the first surface 21, reflected by the third surface 23, emitted from the second surface 22, and are then incident on the first detection surface 41.

As illustrated in FIG. 13 by way of example, because the second propagation unit 20 includes the second prism 20*b*, the third surface 23 of the first prism 20*a* can be protected. If a foreign matter such as water, oil, or dust adheres to the exterior of the third surface 23, it may hinder total reflection of the electromagnetic waves incident on the third surface 23 from the inside and, simultaneously, affect electromagnetic waves to be reflected by the third surface 23 and incident on the second detector 50. Because the third surface 23 is protected, the condition for the total reflection on the third surface 23 can be maintained, and the electromagnetic waves to be incident on the second detector 50 is less likely to be affected.

Figure 14:
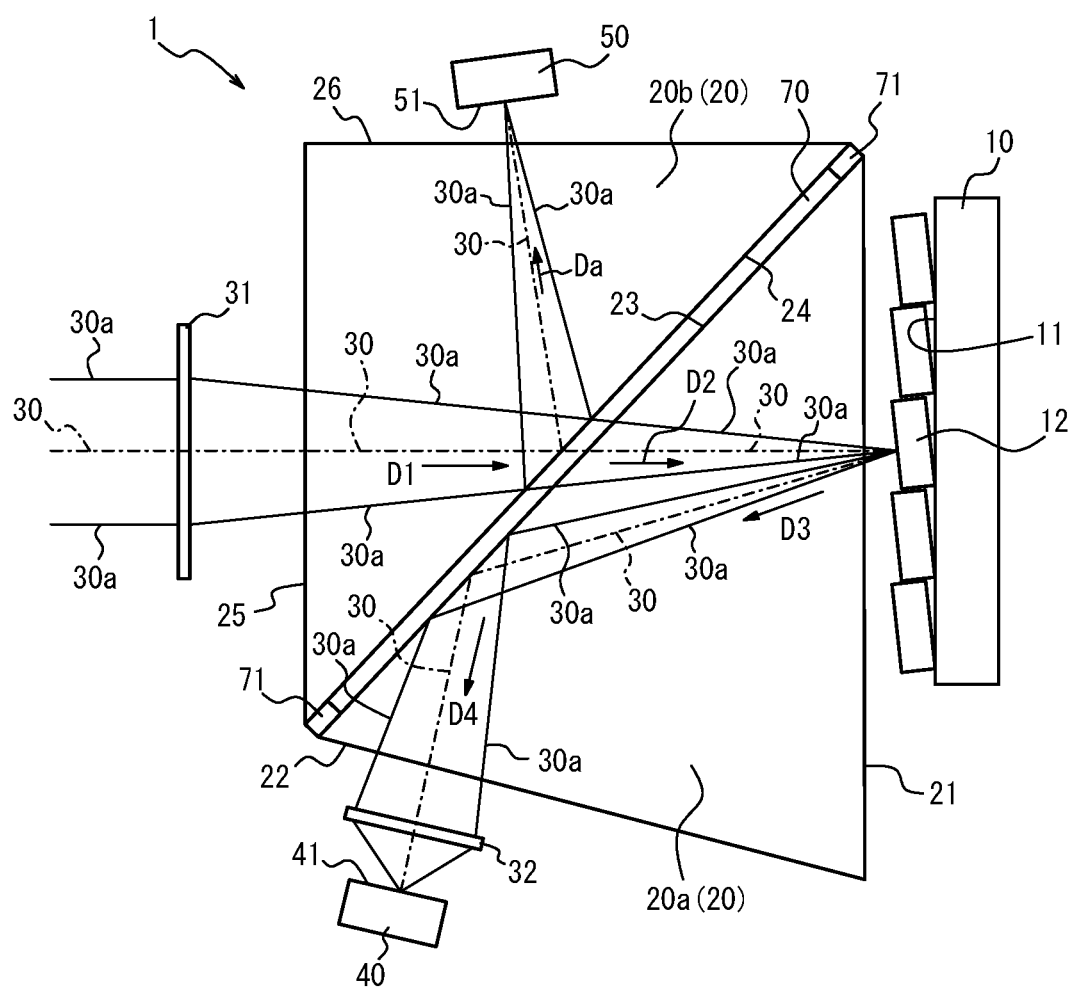
FIG. 14 is a diagram illustrating an example configuration in which the second propagation unit includes an intermediate layer between the two prisms.

In the electromagnetic wave detection apparatus 1 according to the embodiment, as illustrated in FIG. 14, the second propagation unit 20 may further include the intermediate layer 70 between the first prism 20*a* and the second prism 20*b*, in addition to the configuration illustrated in FIG. 13 by way of example. The intermediate layer 70 may include at least one of vacuum, a gas, a liquid, a solid, and an amorphous. The intermediate layer 70 may include an air layer or a prism. The refractive index of the intermediate layer 70 is smaller than the refractive index of the first prism 20*a*. The refractive index of the second prism 20*b* may be the same as or different from the refractive index of the first prism 20*a*. The refractive index of the second prism 20*b* may be the same as or different from the refractive index of the intermediate layer 70. The spacer 71 is arranged to maintain a fixed distance between the first prism 20*a* and the second prism 20*b*. That is, the spacer 71 is arranged to maintain a fixed thickness of the intermediate layer 70. In a case in which the intermediate layer 70 has no fluidity or small fluidity, the spacer 71 may be omitted.

The third surface 23 of the first prism 20*a* forms a boundary surface between the first prism 20*a* and the intermediate layer 70. The fourth surface 24 of the second prism 20*b* forms a boundary surface between the second prism 20*b* and the intermediate layer 70.

The electromagnetic waves can propagate along the propagation axis 30 illustrated in FIG. 14. The electromagnetic waves are incident on the fifth surface 25 of the second prism 20*b*. In a case in which the electromagnetic wave detection apparatus 1 includes the first image forming unit 31, the electromagnetic waves are incident on the fifth surface 25 after passing through the first image forming unit 31. The principal plane of the first image forming unit 31 may be parallel to the fifth surface 25. The direction in which the first image forming unit 31 causes the electromagnetic waves to be incident on the fifth surface 25 may be orthogonal to the fifth surface 25. The fifth surface 25 causes the incident electromagnetic waves to propagate in the first direction represented by D1. That is, the electromagnetic waves propagate in the first direction within the second prism 20*b*.

The electromagnetic waves propagating in the first direction are incident on the fourth surface 24. A part of the electromagnetic waves incident on the fourth surface 24 passes through the intermediate layer 70 and is then incident on the third surface 23. Another part of the electromagnetic waves incident on the fourth surface 24 is reflected by the fourth surface 24, propagates in the direction represented by Da, exits from the sixth surface 26 of the second prism 20*b*, and is then incident on the second detection surface 51 of the second detector 50. That is, the fourth surface 24 separates the incident electromagnetic waves into the electromagnetic waves to be incident on the third surface 23 and the electromagnetic waves to be incident on the second detection surface 51.

The third surface 23 causes the electromagnetic waves to propagate in the second direction represented by D2. That is, the electromagnetic waves propagate in the second direction within the first prism 20*a*. The electromagnetic waves may be refracted at the boundary surface between the second prism 20*b* and the intermediate layer 70 and the boundary surface between the intermediate layer 70 and the first prism 20*a* and change its propagation direction. The electromagnetic waves may propagate in the same direction as a result, after being refracted at the boundary surface between the second prism 20b and the intermediate layer 70 and the boundary surface between the intermediate layer 70 and the first prism 20a. When the electromagnetic waves are perpendicularly incident on the boundary surface, the electromagnetic waves can propagate straight without being refracted at the boundary surface. That is, the first direction and the second direction may be the same direction.

The electromagnetic waves propagating in the second direction within the first prism 20a can propagate along the propagation axis 30 and thus can be emitted to and re-enter the first surface 21, reflected by the third surface 23, exit from the second surface 22, and then incident on the first detection surface 41.

The configuration in which the intermediate layer 70 is arranged between the first prism 20a and the second prism 20b as illustrated in FIG. 14 by way of example is also referred to as the total internal reflection prism. The total internal reflection prism is also referred to as the TIR (TIR: Total Internal Reflection) prism. Because the second propagation unit 20 includes the TIR prism as illustrated in FIG. 14 by way of example, the condition for the total reflection on the third surface 23 can be easily maintained. The intermediate layer 70 is positioned between the first prism 20a and the second prism 20b, whereby the flexibility of the refractive index and the shape of the second prism 20b can be increased. Further, the electromagnetic waves reflected by the fourth surface 24 and incident on the second detector 50 are less likely to be affected.

Figure 15:
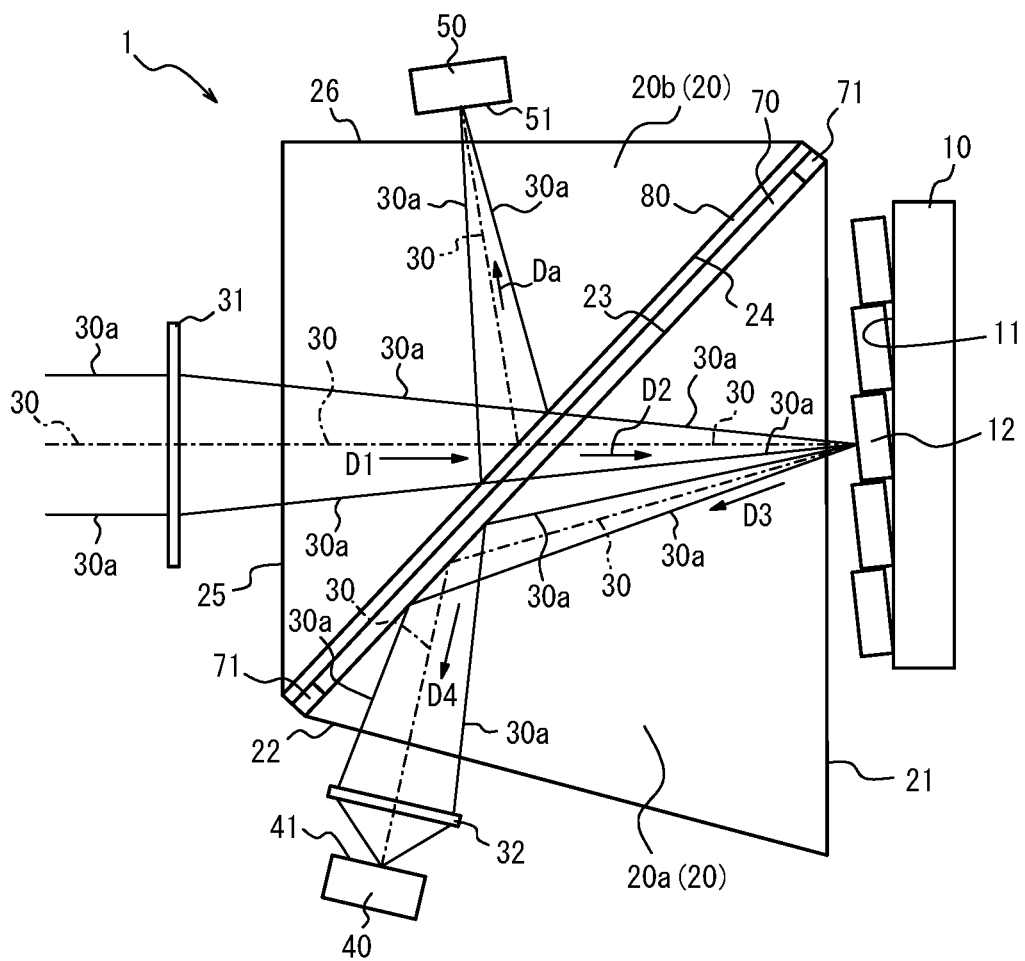
FIG. 15 is a diagram illustrating an example configuration in which the second propagation unit includes a separator and the intermediate layer between the two prisms.

In the electromagnetic wave detection apparatus 1 according to the embodiment, as illustrated in FIG. 15, the second propagation unit 20 may further includes a separator 80 between the intermediate layer 70 and the second prism 20b, in addition to the configuration illustrated in FIG. 14 by way of example. The separator 80 may be arranged on the fourth surface 24. In a case in which the separator 80 is arranged on the fourth surface 24, the fourth surface 24 forms a boundary surface between the second prism 20b and the separator 80. The third surface 23 of the first prism 20a forms a boundary surface between the first prism 20a and the intermediate layer 70. The separator 80 may include a configuration the same as or similar to the configuration described with respect to the separator 80 illustrated in FIG. 11 by way of example.

The electromagnetic waves can propagate along the propagation axis 30 illustrated in FIG. 15 by way of example. The electromagnetic waves are incident on the fifth surface 25 of the second prism 20b. In a case in which the electromagnetic wave detection apparatus 1 includes the first image forming unit 31, the electromagnetic waves are incident on the fifth surface 25 after passing through the first image forming unit 31. The principal plane of the first image forming unit 31 may be parallel to the fifth surface 25. The direction in which the first image forming unit 31 causes the electromagnetic waves to be incident on the fifth surface 25 may be orthogonal to the fifth surface 25. The fifth surface 25 causes the incident electromagnetic waves to propagate in the first direction represented by D1. That is, the electromagnetic waves propagate in the first direction within the second prism 20b.

The electromagnetic waves propagating in the first direction are incident on the fourth surface 24. That is, the electromagnetic waves are incident on the boundary surface between the second prism 20b and the separator 80. A part of the electromagnetic waves incident on the fourth surface 24 passes through the separator 80 and the intermediate layer 70 and is then incident on the third surface 23 of the first prism 20a. Another part of the electromagnetic waves incident on the fourth surface 24 is reflected by the boundary surface, propagates in the direction represented by Da, exits from the sixth surface 26 of the second prism 20b, and is then incident on the second detection surface 51 of the second detector 50. That is, the boundary surface between the fourth surface 24 and the separator 80 or the boundary surface between the second prism 20b and the separator 80 separates the incident electromagnetic waves into the electromagnetic waves to be incident on the third surface 23 and the electromagnetic waves to be incident on the second detection surface 51.

The third surface 23 causes the electromagnetic waves to propagate in the second direction represented by D2. That is, the electromagnetic waves propagate in the second direction within the first prism 20a. The electromagnetic waves may be refracted at the boundary surface between the separator 80 and the intermediate layer 70 and the boundary surface between the intermediate layer 70 and the first prism 20a and change its propagation direction. The electromagnetic waves may propagate in the same direction as a result, after being refracted at the boundary surface between the separator 80 and the intermediate layer 70 and the boundary surface between the intermediate layer 70 and the first prism 20a. When the electromagnetic waves are perpendicularly incident on the boundary surface, the electromagnetic waves can propagate straight without being refracted at the boundary surface. That is, the first direction and the second direction may be the same direction.

The electromagnetic waves propagating in the second direction within the first prism 20a can propagate along the propagation axis 30 and thus are emitted to and re-enter the first surface 21, reflected by the third surface 23, exiting from the second surface 22, and then incident on the first detection surface 41.

When the electromagnetic wave detection apparatus 1 includes the separator 80 on the fourth surface 24 of the second prism 20b as illustrated in FIG. 15 by way of example, the electromagnetic wave detection apparatus 1 can easily control the electromagnetic waves to be incident on the second detector 50.

Although the disclosure has been described based on the figures and the embodiments, it is to be understood that various changes and modifications may be implemented based on the disclosure herein by those who are ordinarily skilled in the art. Accordingly, such changes and modifications are included in the scope of the disclosure herein. For example, functions and the like included in each functional unit may be rearranged without logical inconsistency, so as to combine a plurality of functions together or to subdivide them. Also, each of the above embodiments does not need to be practiced strictly following the description thereof but may be implemented by appropriately combining or partially omitting features.

The descriptions such as "first" and "second" used herein are identifiers for distinguishing the configuration. In the configuration distinguished by the descriptions of "first" and "second", such numbers can be interchanged. For example, the first prism and the second prism can interchange their identifiers: "first" and "second". The interchange is performed simultaneously. The configuration remains being distinguished after the interchange. The identifiers may be removed. The configurations from which the identifiers are removed may be distinguished by reference signs. The descriptions of the identifiers "first" and "second" alone should not be used as a ground that defines the order of the elements or as a ground that proves the presence of a smaller numbered identifier.

The invention claimed is:

1. An electromagnetic wave detection apparatus comprising:
    an irradiator that radiates electromagnetic waves to a detection object;
    a first propagation unit that includes a reference surface and a plurality of pixels, wherein the each of the pixels transits to a first state to cause the electromagnetic waves incident on the reference surface to propagate in a predetermined direction or a second state to cause the electromagnetic waves to propagate in a direction different from the predetermined direction;
    a detector that includes a detection surface and detects reflected waves incident on the detection surface, wherein the reflected waves are the electromagnetic waves radiated from the irradiator and reflected on the detection object; and
    a second propagation unit that includes a first surface opposing the reference surface, a second surface opposing the detection surface, and a third surface intersecting the first surface and the second surface,
    wherein the third surface causes electromagnetic waves propagating in a first direction intersecting the third surface to propagate in a second direction intersecting the first surface,
    the first surface causes electromagnetic waves propagating in a second direction to be incident on the reference surface,
    the first surface causes electromagnetic waves re-incident from the reference surface to propagate in a third direction intersecting the third surface by the pixel transited to the first state,
    the third surface causes electromagnetic waves propagating in the third direction to propagate in a fourth direction intersecting the second surface,
    the second surface emits electromagnetic waves propagating in the fourth direction to the detection surface, and
    the third surface separates electromagnetic waves progressing in the first direction into the electromagnetic waves propagating in the second direction and the electromagnetic waves reflected on the third surface, based on their wavelengths.

2. The electromagnetic wave detection apparatus according to claim 1,
    wherein the third surface internally reflects electromagnetic waves propagating in the third direction and causes the electromagnetic waves to propagate in a fourth direction.

3. The electromagnetic wave detection apparatus according to claim 1,
    wherein an incident angle of electromagnetic waves propagating in a third direction with respect to a third surface is equal to or larger than a critical angle.

4. The electromagnetic wave detection apparatus according to claim 1,
    wherein a second propagation unit includes a first prism comprising at least three surfaces, and
    each of a first surface, a second surface, and a third surface are included in the surfaces of the first prism.

5. The electromagnetic wave detection apparatus according to claim 4,
    wherein a second propagation unit further includes a second prism comprising at least a fourth surface, a fifth surface, and a sixth surface,
    the fourth surface is positioned along the third surface of the first prism,
    the fifth surface intersects an incident direction of electromagnetic waves with respect to the second propagation unit, and
    the sixth surface intersects each of the fourth surface and the fifth surface.

6. The electromagnetic wave detection apparatus according to claim 5,
    further comprising a first image forming unit configured to image electromagnetic waves propagating to a second propagation unit and cause the electromagnetic waves to be incident on the fifth surface of the second prism.

7. The electromagnetic wave detection apparatus according to claim 1,
    further comprising a controller configured to acquire information regarding the surroundings, based on a detection result of electromagnetic waves by the detector.

8. The electromagnetic wave detection apparatus according to claim 7,
    wherein the information regarding the surroundings includes distance information.

9. An information acquisition system comprising:
    the electromagnetic wave detection apparatus according to claim 1; and
    a control apparatus that acquires information regarding the surroundings, based on a detection result of electromagnetic waves by a detector.

10. The electromagnetic wave detection apparatus according to claim 1,
    wherein the third surface reflects, from among electromagnetic waves progressing in the first direction, electromagnetic waves having a wavelength in a predetermined range at a reflectance of a predetermined value or more and electromagnetic waves having a wavelength out of the predetermined range at a reflectance smaller than the predetermined value.

11. The electromagnetic wave detection apparatus according to claim 1,
    comprising a second detector configured to detect electromagnetic waves reflected by the third surface from among electromagnetic waves progressing in the first direction.

12. The electromagnetic wave detection apparatus according to claim 11,
    wherein a length of a path of electromagnetic waves from the third surface to the reference surface is equal to a length of a path of electromagnetic waves from the third surface to a detection surface of the second detector.

13. The electromagnetic wave detection apparatus according to claim 12,
    wherein one of the first detector and the second detector is a distance measuring sensor to measure a distance to the detection object based on the reflected waves,
    wherein another of the first detector and the second detector is an image sensor to image the detection object based on the electromagnetic waves incident on the image sensor.

14. The electromagnetic wave detection apparatus according to claim 13,
wherein the irradiator radiates infrared light, and
wherein the third surface includes a cold mirror.

15. The electromagnetic wave detection apparatus according to claim 13,
wherein the irradiator comprises a first irradiator and a second irradiator,
wherein the first detector detects the reflected waves of the electromagnetic waves radiated from the first irradiator, and
wherein the second detector detects the reflected waves of the electromagnetic waves radiated from the second irradiator.

16. An electromagnetic wave detection apparatus comprising:
a irradiator that radiates electromagnetic waves to a detection object;
a first propagation unit that includes a reference surface and a plurality of pixels, wherein the each of the pixels transits to a first state to cause the electromagnetic waves incident on the reference surface to propagate in a predetermined direction or a second state to cause the electromagnetic waves to propagate in a direction different from the predetermined direction;
a first detector that includes a detection surface and detects reflected waves incident on the detection surface, wherein the reflected waves is the electromagnetic waves radiated from the irradiator and reflected on the detection object;
a second detector that detects the electromagnetic waves; and
a second propagation unit that includes a first surface opposing the reference surface, a second surface opposing the detection surface, and a third surface intersecting the first surface and the second surface,
wherein the third surface causes part of electromagnetic waves propagating in a first direction intersecting the third surface to propagate in a second direction intersecting the first surface and causes other part of electromagnetic waves propagating in the first direction to reflect and propagate toward the second detector,
the first surface causes electromagnetic waves propagating in a second direction to be incident on the reference surface,
the first surface causes electromagnetic waves re-incident from the reference surface to propagate in a third direction intersecting the third surface by the pixel transited to the first state,
the third surface causes electromagnetic waves propagating in the third direction to propagate in a fourth direction intersecting the second surface, and
the second surface emits electromagnetic waves propagating in the fourth direction to the detection surface.

* * * * *